(12) United States Patent
Zhou et al.

(10) Patent No.: US 8,380,061 B2
(45) Date of Patent: Feb. 19, 2013

(54) METHOD, SYSTEM AND DEVICE FOR PROTECTING LONG-REACH PASSIVE OPTICAL NETWORK

(75) Inventors: Jianlin Zhou, Shenzhen (CN); Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 12/689,043

(22) Filed: Jan. 18, 2010

(65) Prior Publication Data

US 2010/0119228 A1    May 13, 2010

Related U.S. Application Data

(63) Continuation of application No. PCT/CN2008/072520, filed on Sep. 25, 2008.

(30) Foreign Application Priority Data

Sep. 26, 2007   (CN) .......................... 2007 1 0151697

(51) Int. Cl.
*H04B 10/00* (2006.01)

(52) U.S. Cl. .................. 398/6; 398/1; 398/11; 398/18; 398/19; 398/58; 398/66; 398/177

(58) Field of Classification Search .............. 398/1–8, 398/11, 18, 19, 45–75
See application file for complete search history.

(56) References Cited

U.S. PATENT DOCUMENTS

| | | | |
|---|---|---|---|
| 6,331,906 B1* | 12/2001 | Sharma et al. | 398/48 |
| 6,469,981 B1* | 10/2002 | Anhorn | 370/217 |
| 6,925,054 B1* | 8/2005 | Atterton et al. | 370/218 |
| 6,980,736 B1* | 12/2005 | Fee et al. | 398/19 |
| 7,634,160 B2 | 12/2009 | Li et al. | |
| 2002/0071149 A1 | 6/2002 | Xu et al. | |
| 2003/0133712 A1* | 7/2003 | Arikawa et al. | 398/2 |
| 2004/0114925 A1* | 6/2004 | Berthold et al. | 398/45 |

(Continued)

FOREIGN PATENT DOCUMENTS

| | | |
|---|---|---|
| CN | 1479460 A | 3/2004 |
| CN | 1567749 A | 1/2005 |

(Continued)

OTHER PUBLICATIONS

Phillips et al., "Redundancy Strategies for a High Splitting Optically Amplified Passive Optical Network," *Journal of Lightwave Technology*, 19(2): 137-149 (Feb. 2001).

(Continued)

*Primary Examiner* — Li Liu
(74) *Attorney, Agent, or Firm* — Leydig, Voit & Mayer, Ltd.

(57) ABSTRACT

A method, system and device for protecting a Long Reach Passive Optical Network (LR-PON) system are provided. The Electrical Relay (E-R) device receives the optical signal transmitted on two fiber transmission paths by the Optical Line Terminal (OLT) or Optical Network Unit (ONU) on one side, performs optical-to-electrical (O/E) conversion, signal regeneration, and electrical-to-optical (E/O) conversion for the optical signal, and sends the signal to the ONU or the OLT on the other side through the two fiber transmission paths. Through backup of the fiber transmission path, an LR-PON system protection method is provided to improve the reliability of the LR-PON system. The method, system, and device for protecting the LR-PON system under the present invention all support and are compatible with the existing functions of all devices in the existing LR-PON system.

14 Claims, 15 Drawing Sheets

U.S. PATENT DOCUMENTS

| | | |
|---|---|---|
| 2005/0147410 A1 | 7/2005 | Smith |
| 2005/0213970 A1* | 9/2005 | Kimura et al. ............... 398/45 |
| 2006/0083513 A1 | 4/2006 | Huang et al. |
| 2006/0133804 A1* | 6/2006 | Boduch et al. ............... 398/5 |
| 2008/0267628 A1 | 10/2008 | Li et al. |

FOREIGN PATENT DOCUMENTS

| | | | |
|---|---|---|---|
| CN | 1848709 A | 10/2006 |
| CN | 1925371 A | 3/2007 |
| CN | 101009521 A | 8/2007 |
| CN | 101040472 A | 9/2007 |
| JP | 2001-326654 A | 11/2001 |
| WO | 2004008833 A2 | 1/2004 |
| WO | 2006116895 A1 | 11/2006 |
| WO | WO 2006/116895 A1 | 11/2006 |

OTHER PUBLICATIONS

Written Opinion of International Searching Authority in corresponding PCT Application No. PCT/CN2008/072520 (Dec. 4, 2008).

1st Office Action in corresponding Chinese Application No. 200710151697.2 (Sep. 2, 2010).

2nd Office Action in corresponding Chinese Application No. 200710151697.2 (May 6, 2011).

Supplementary European Search Report in corresponding European Patent Application No. 08800992.3 (Feb. 14, 2011).

* cited by examiner

METHOD, SYSTEM AND DEVICE FOR PROTECTING LONG-REACH PASSIVE OPTICAL NETWORK

CROSS-REFERENCE TO RELATED APPLICATIONS

This application is a continuation of International Patent Application No. PCT/CN2008/072520, filed Sep. 25, 2008, which claims priority to Chinese Patent Application No. 200710151697.2, filed Sep. 26, 2007, both of which are hereby incorporated by reference in their entireties.

FIELD OF THE INVENTION

The present invention relates to a Passive Optical Network (PON) technology, and in particular, to a method, system and device for protecting a Long-Reach PON (LR-PON).

BACKGROUND OF THE INVENTION

With the emergence of new services such as Video On Demand (VOD), high definition television, and online gaming, the bandwidth required by users is increasing. The development of Fiber To The Home (FTTH) ensures the last mile bandwidth of the access network. The PON technology is one of the most widely applied FTTH technologies currently.

FIG. 1 shows a network architecture of a traditional PON in the conventional art. As shown in FIG. 1, in which a PON system is composed of an Optical Line Terminal (OLT), an Optical Network Unit (ONU), an optical splitter, and an Optical Distribution Network (ODN). The OLT is connected to the optical splitter through a trunk fiber, and the ONU is connected to the optical splitter through a branch fiber. The trunk fiber, optical splitter, and branch fiber constitute an ODN. The direction from the OLT to the ONU is the downstream direction, and the direction from the ONU to the OLT is the upstream direction.

The conventional art provides a PON system protection model to avoid PON system failures. FIG. 2 shows a Gigabit-PON (GPON) system backup model in the conventional art. In the backup model shown in FIG. 2, both the ONU and the OLT have two ODN interfaces in addition to the ODN backup. This protection model may have four protection modes. FIG. 3a is a type-A protection mode, which provides backup only for the trunk fiber between the OLT and the optical splitter. FIG. 3b shows a type-B protection mode, which provides backup for both the trunk fiber and the OLT. FIG. 3c shows a type-C protection mode, which provides backup for the OLT, the trunk fiber, the optical splitter, the branch fibers, and all ONUs. FIG. 3d shows a type-D protection mode, which provides backup for the OLT, the trunk fiber, the optical splitter, the branch fibers, and some ONUs. Table 1 shows the characteristics of the four protection modes. In practice, a proper protection mode may be selected according to the actual requirements and the characteristics of the four protection modes.

TABLE 1

| Protection Mode | Redundant Device | Backup State | Whether Frames or Signals Are Lost in Switching | Protection Cost |
| --- | --- | --- | --- | --- |
| Type A | Two fibers, a single OLT, a single ONU, and a single optical splitter | Cold backup | Yes | Low |
| Type B | Two fibers, two OLTs, a single ONU, and a single optical splitter | Cold backup | Yes | Moderate |
| Type C | Two fibers, two OLTs, two ONUs, and two optical splitters | Hot backup | No | Highest |
| Type D | Two fibers, two OLTs, partially two ONUs, and two groups of optical splitter pairs | Cold backup | Yes | High |

In a traditional PON system, few ONUs are connected to the OLT through the optical splitter, and the coverage radius is small. Consequently, in the traditional network structure, the quantity of OLTs is large, and the location areas are remote and distributed, thus bringing inconvenience of management and maintenance. With the emergence of the next-generation optical access network, the LR-PON system is proposed. Because the all optical long-reach technology is difficult to implement and costly, the solution characterised by Electrical Relay (E-R)-based long-reach regenerator comes forth. FIG. 4 shows a structure of an LR-PON system implemented through an E-R device in the conventional art. As shown in FIG. 4, an E-R device is set between the optical splitter and the OLT, and a traditional ODN is divided into two ODNs, namely, ODN 1 and OND 2 in FIG. 4. The E-R device regenerates the signal, namely, performs Reamplifying, Reshaping, Retiming (3R) for the signal, thus reducing the signal defect as a result of long reach of the OLT in an LR-PON system in the transmission. FIG. 5 shows a structure of an E-R device in the conventional art. As shown in FIG. 5, the E-R device includes an optical-to-electrical converting unit (O/E unit) 501, a signal regenerating unit 502, and an electrical-to-optical converting unit (E/O unit) 503. The O/E unit 501 is configured to receive the downstream optical signal from the OLT, or receive the upstream optical signal from the ONU, and convert the received optical signal into an electrical signal. The signal regenerating unit 502 is configured to perform 3R processing for the converted electrical signal from the O/E unit 501. The E/O unit 503 is configured to convert the electrical signal processed by the signal regenerating unit 502 into an optical signal, and send the signal.

An active E-R device is introduced into the LR-PON, thus increasing instability of the LR-PON system. The optical transmission path is extended from 20 km to 100 km, and the failure probability of the long-reach fiber path is increased. After the coverage is widened, more services are affected once a failure occurs. Therefore, the LR-PON system needs protection urgently. However, no protection method is available for protecting the LR-PON system at present.

SUMMARY OF THE INVENTION

A method, system, and device for protecting an LR-PON system are provided in embodiments of the present invention to improve reliability of the LR-PON system.

An LR-PON protection system is provided. The system includes an OLT, an E-R device, and an ONU.

The OLT is configured to: send an optical signal to the E-R device through two fiber transmission paths, and receive the optical signal from the E-R device through the two fiber transmission paths.

The E-R device is configured to: receive the optical signal from the OLT or ONU on one side; perform O/E conversion, signal regeneration, and E/O conversion for the optical signal; and send the signal to the ONU or OLT on the other side.

The ONU is configured to: receive the optical signal from the E-R device through two fiber transmission paths, and send the optical signal to the E-R device through the two fiber transmission paths.

An LR-PON protection method is provided. The method includes: (1) by an E-R device, obtaining optical signals transmitted through two fiber transmission paths on one side, and performing O/E conversion for the optical signals transmitted through the two paths; (2) selecting an electrical signal on one path among the converted electrical signals on the two paths; and (3) performing signal regeneration for the selected electrical signal, performing E/O conversion for the regenerated electrical signal, and sending the converted optical signal through two fiber transmission paths on the other side.

An E-R device is provided. The E-R device includes: two O/E units, an automatic switching unit, a signal regenerating unit, and two E/O units.

Each O/E unit is configured to: receive an optical signal sent along a fiber transmission path connected to the O/E unit, and perform O/E conversion for the optical signal to obtain an electrical signal.

The automatic switching unit is configured to select an electrical signal on one path among the electrical signals transmitted on two paths and obtained from the two O/E units.

The signal regenerating unit is configured to: perform signal regeneration for the electrical signal selected by the automatic switching unit, and send the regenerated electrical signal to the two E/O units.

Each E/O unit is configured to: convert the electrical signal sent by the signal regenerating unit into an optical signal, and send the optical signal through a fiber transmission path connected to the E/O unit.

It can be seen from the foregoing technical solution that: In the method, system and device for protecting the LR-PON system, the E-R device receives an optical signal from the OLT or ONU through two fiber transmission paths on one side, performs O/E conversion, signal regeneration and E/O conversion for the optical signal, and sends the signal to the ONU or OLT through two fiber transmission paths on the other side. Through backup of the fiber transmission path, an LR-PON system protection method, which is unavailable in the conventional art, is provided in the embodiments of the present invention to improve the LR-PON system reliability. The method, system, and device for protecting the LR-PON system under the present invention all support and are compatible with the existing functions of all devices in the existing LR-PON system.

DETAILED DESCRIPTION OF THE EMBODIMENTS

To make the technical solution, objectives and merits of the present invention clearer, the following describes the present invention in detail with reference to accompanying drawings and exemplary embodiments.

The method provided in an embodiment of the present invention includes: using two fibers for backup in an ODN on both sides of an E-R device in an LR-PON system.

According to this method, the fibers in the ODN on both sides of the E-R device can be used for backup, or two E-R devices are used for backup, or a dual-optical-interface E-R device is used for backup.

Figure 6A:
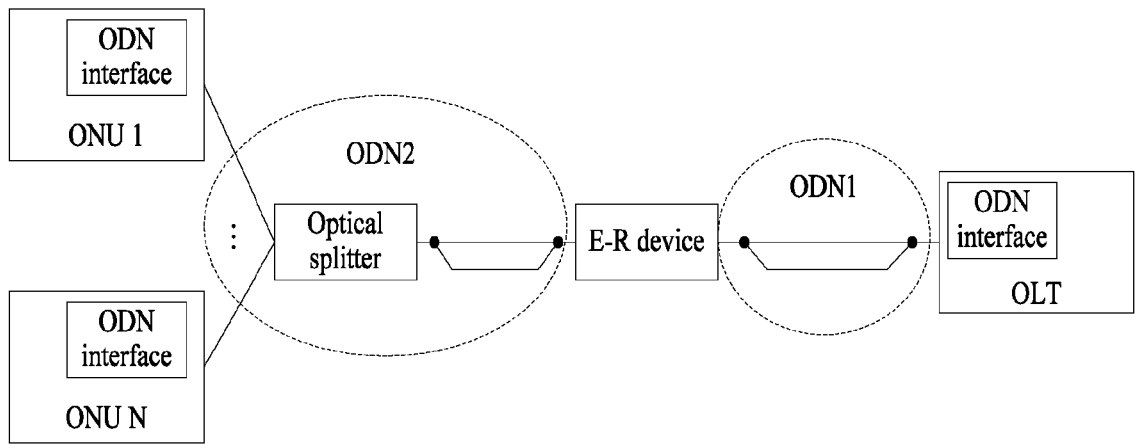
FIG. 6a shows an LR-PON system under type A-I protection according to an embodiment of the present invention.

The method provided in this embodiment may employ four types of protection:

Type A: Two fibers, a single OLT, a single ONU, and a single optical splitter are applied. This protection type is subdivided into the following three types:

Type A-I: Only the fibers in the ODN on both sides of the E-R device are backed up. FIG. 6a shows an LR-PON system under type A-I protection according to an embodiment of the present invention. A downstream signal sent from the OLT or an upstream signal sent from the ONU is transmitted on two fibers. Therefore, once one fiber fails, the signal is still transmitted between the OLT and the ONU reliably. This protection mode is the most cost-efficient one.

In this protection mode, the E-R device may be capable of detecting signal defects and may also be incapable of detecting signal defects. If the E-R device is incapable of detecting signal defects, the E-R device performs O/E conversion for the received optical signal, performs 3R processing, and performs E/O conversion for the signal, and then sends the signal to the ONU or OLT through two fibers on the other side. The defect detection, defect decision and signal selection performed by the ONU or OLT over the received signal are based on conventional and well-known devices, and are not described further.

If the E-R device is capable of signal detection, the E-R device performs defect detection for the received signal. If the signal is detected as defective, the E-R device returns an alarm indication signal to the transmitter-side OLT or ONU which sends the signal, and may also insert an alarm indication signal into the signal sent to the receiver-side ONU or OLT to facilitate fault analysis and locating.

Figure 6B:
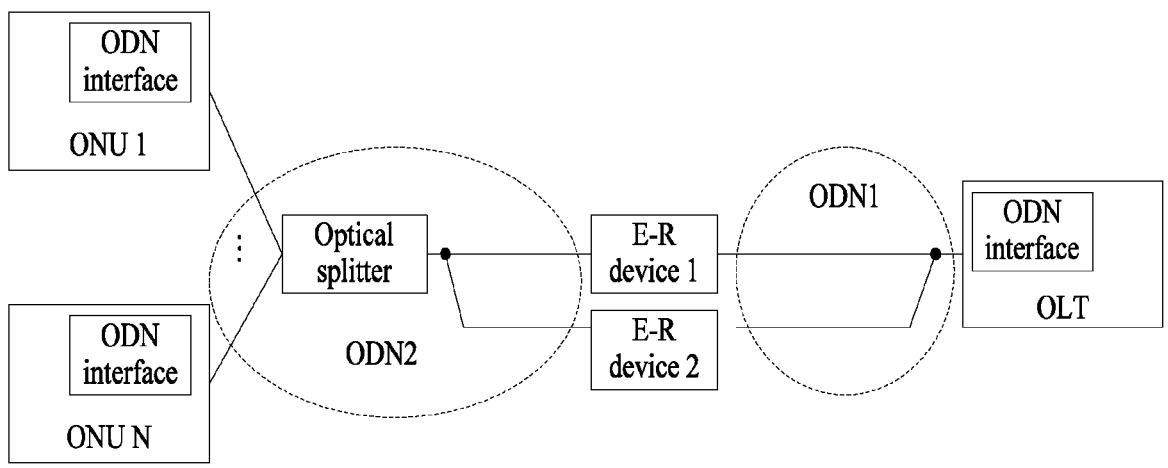
FIG. 6b shows an LR-PON system under type A-II protection according to an embodiment of the present invention.

Type A-II: The E-R device and the fibers in the ODN on both sides of the E-R device are backed up. That is, two E-R devices and two fibers are applied. As shown in FIG. 6b, the E-R device 1 and the fibers on both sides of the E-R device 1 as well as the E-R device 2 and the fibers on both sides of the E-R device 2 make up two independent transmission paths. An upstream signal or downstream signal may be transmitted on the two transmission paths. The E-R device may be capable of signal detection and may also be incapable of detecting signal defects.

If the E-R device is incapable of signal detection, the signal sent from the OLT or ONU is transmitted on the two transmission paths simultaneously. The receiver-side ONU or OLT selects a non-defective signal transmitted through one of the two fiber paths, and discards the signal transmitted through the other path.

If the E-R device is capable of signal detection, the E-R device performs defect detection for the received signal. If the signal is detected as defective, the E-R device returns an alarm indication signal to the transmitter-side OLT or ONU which sends the signal, and may also insert an alarm indication signal into the signal sent to the receiver-side ONU or OLT to facilitate fault analysis and locating, and may further assist the OLT or ONU in determining and selecting a non-defective transmission path for transmitting and receiving data.

Figure 6C:
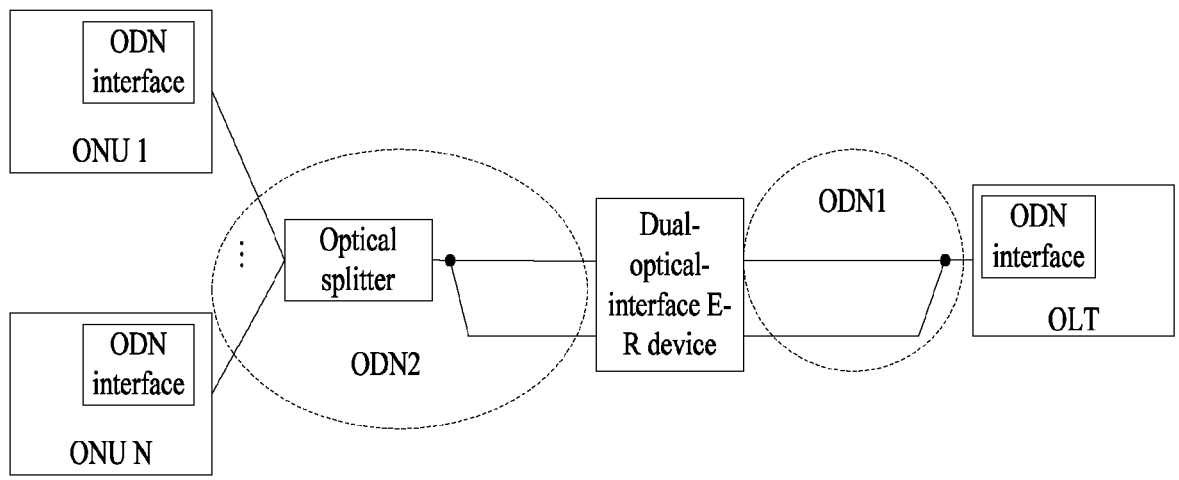
FIG. 6c shows an LR-PON system under type A-III protection according to an embodiment of the present invention.

Type A-III: The fibers in the ODN on both sides of the E-R device are backed up, and a dual-optical-interface E-R device is applied. As shown in FIG. 6c, two fiber transmission paths share an E-R device through different optical interfaces. The signal sent by the transmitter-side OLT or ONU is transmitted to the E-R device through two fiber paths in an ODN. Through two ODN receiving interfaces, the E-R device receives the signal transmitted along the two fiber paths respectively, selects the signal transmitted from one of the paths, and performs 3R processing for the signal. Afterward, the E-R device sends the signal to two fiber paths in another ODN through two ODN transmitting interfaces. The receiver-side ONU or OLT selects a non-defective signal transmitted through one of the two fiber paths, and discards the signal transmitted through the other path.

Figure 7A:
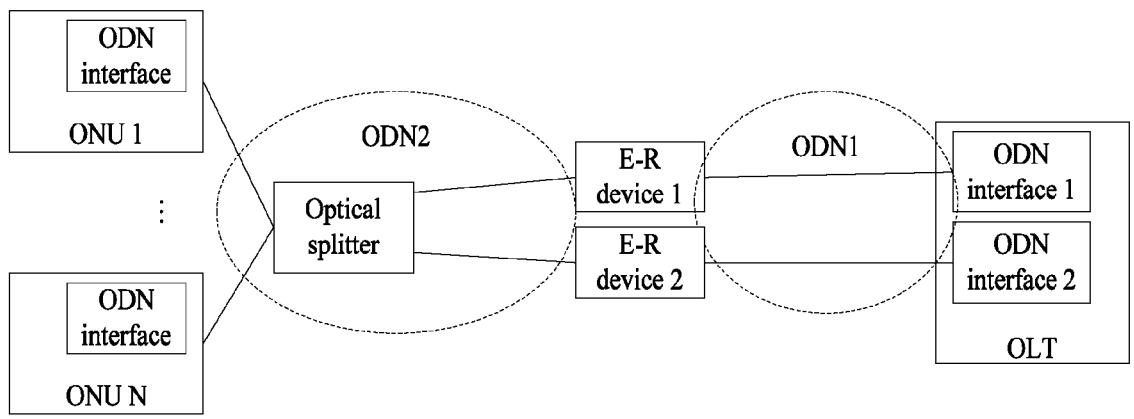
FIG. 7a shows an LR-PON system under type B-I protection according to an embodiment of the present invention.

Type B: Two fibers, two OLTs, a single ONU, and a single optical splitter are applied. This protection type is subdivided into the following two types:

Type B-I: The E-R device and the fibers in the ODN on both sides of the E-R device are backed up. That is, two E-R devices and two fibers are applied. As shown in FIG. 7a, the E-R device 1 and the fibers on both sides of the E-R device 1 make up an independent transmission path, which is connected to the ODN interface 1 of the OLT; the E-R device 2 and the fibers on both sides of the E-R device 2 make up another independent transmission path, which is connected to the ODN interface 2 of the OLT. Both the upstream signal and the downstream signal can be transmitted on the two transmission paths. The E-R device may be capable of signal detection and may also be incapable of detecting signal defects.

If the E-R device is incapable of signal detection, the signal sent from the OLT or ONU is transmitted on the two transmission paths simultaneously. The receiver-side ONU or OLT selects a non-defective signal transmitted through one of the two fiber paths, and discards the signal transmitted through the other path.

If the E-R device is capable of signal detection, the E-R device performs defect detection for the received signal. If the signal is detected as defective, the E-R device returns an alarm indication signal to the transmitter-side OLT or ONU which sends the signal, and may also insert an alarm indication signal into the signal sent to the receiver-side ONU or OLT to facilitate fault analysis and locating, and may further assist the OLT or ONU in determining and selecting a non-defective transmission path for transmitting and receiving data.

Figure 7B:
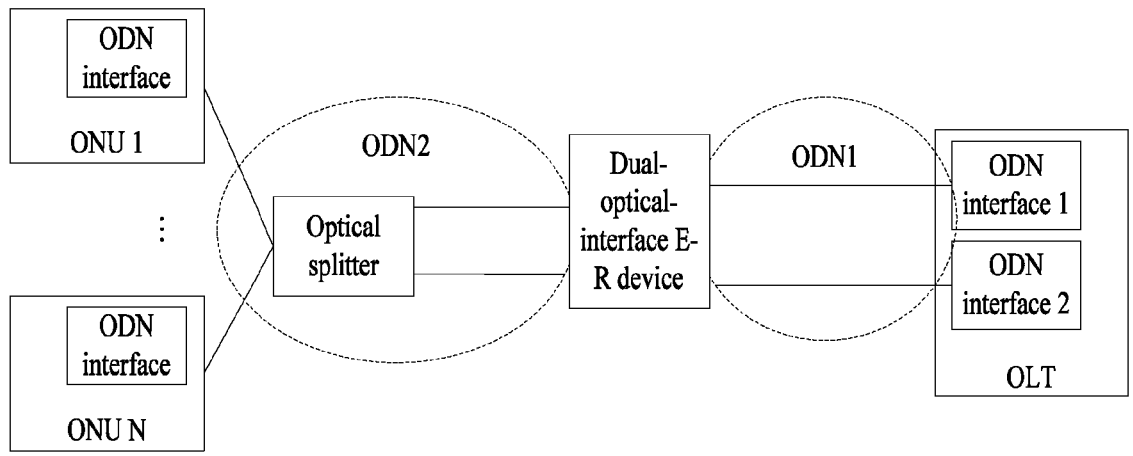
FIG. 7b shows an LR-PON system under type B-II protection according to an embodiment of the present invention.

Type B-II: The fibers in the ODN on both sides of the E-R device are backed up, and a dual-optical-interface E-R device is applied. As shown in FIG. 7b, the OLT is connected to two fiber transmission paths through two ODN interfaces. The two fiber transmission paths share an E-R device through different optical interfaces. The signal sent by the transmitter-side OLT or ONU is transmitted to the E-R device through two fiber paths in an ODN. Through two ODN receiving interfaces, the E-R device receives the signals transmitted along the two fiber paths respectively, selects the signal transmitted from one of the paths, and performs 3R processing for the signal. Afterward, the E-R device sends the signal to two fiber paths in another ODN through two ODN transmitting interfaces. The receiver-side ONU or OLT selects a non-defective signal transmitted through one of the two fiber paths, and discards the signal transmitted through the other path.

Figure 8A:
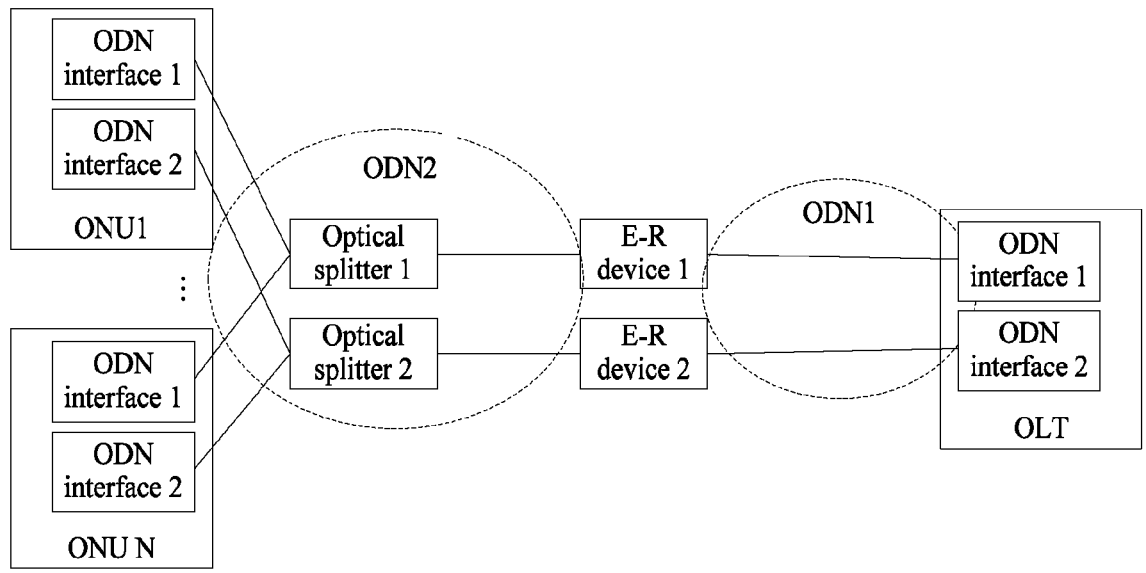
FIG. 8a shows an LR-PON system under type C-I protection according to an embodiment of the present invention.

Type C: Two fibers, two OLTs, two ONUs, and two optical splitters are applied. This protection type is subdivided into the following two types:

Type C-I: The E-R device and the fibers in the ODN on both sides of the E-R device are backed up. That is, two E-R devices and two fibers are applied. As shown in FIG. 8a, the E-R device 1 and the fibers on both sides of the E-R device 1 make up an independent transmission path. One end of this transmission path is connected to the ODN interface 1 of the OLT, and the other end is connected to the ODN interface 1 of each ONU through the optical splitter 1. The E-R device 2 and the fibers on both sides of the E-R device 2 make up another independent transmission path, and one end of this transmission path is connected to the ODN interface 2 of the OLT, and the other end is connected to the ODN interface 2 of each ONU through the optical splitter 2. Both the upstream signal and the downstream signal can be transmitted on the two transmission paths. The signal processing performed by the E-R device in the signal transmission process is the same as that in Type A-II and Type B-I above, and is not described further.

Figure 8B:
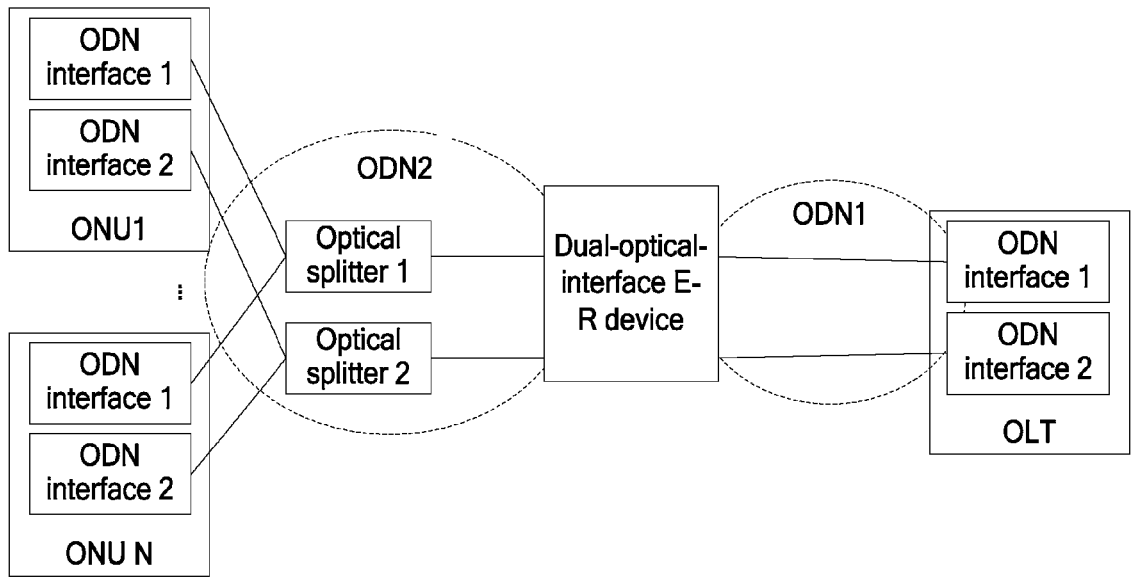
FIG. 8b shows an LR-PON system under type C-II protection according to an embodiment of the present invention.

Type C-II: The fibers in the ODN on both sides of the E-R device are backed up, and a dual-optical-interface E-R device is applied. As shown in FIG. 8b, the OLT is connected to two fiber transmission paths through two ODN interfaces. The two fiber transmission paths share an E-R device through different optical interfaces. Likewise, the two ODN interfaces of the ONU are connected to two fiber transmission paths through two optical splitters. The two fiber transmission paths share an E-R device through different optical interfaces. The signal processing performed by the E-R device in the signal transmission process is the same as that in Type A-III and Type B-II above, and is not described further.

Figure 9A:
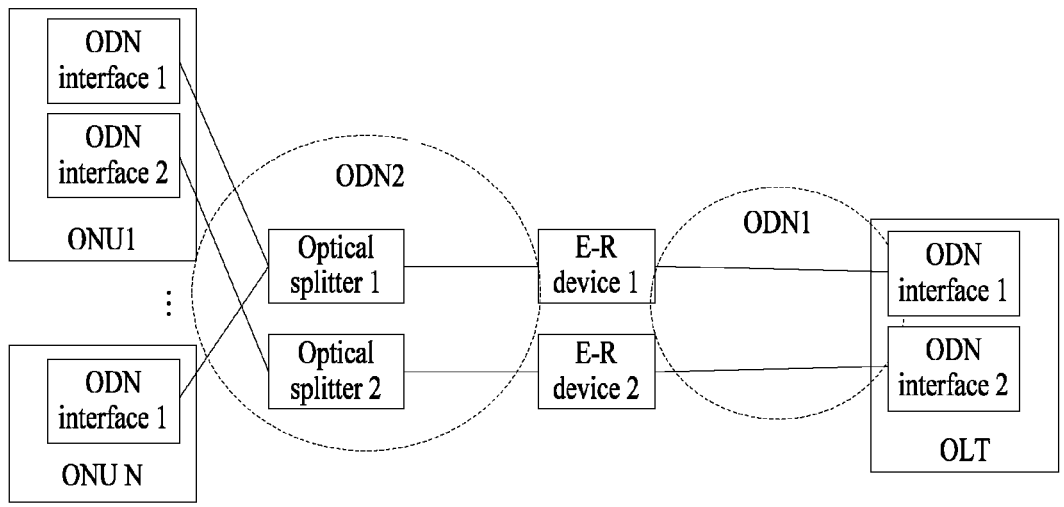
FIG. 9a shows an LR-PON system under type D-I protection according to an embodiment of the present invention.

Type D: Two fibers, two OLTs, partially two ONUs, and two groups of optical splitters are applied. This protection type is subdivided into the following two types:

Type D-I: The E-R device and the fibers in the ODN on both sides of the E-R device are backed up. That is, two E-R devices and two fibers are applied. As shown in FIG. 9a, the E-R device 1 and the fibers on both sides of the E-R device 1 make up an independent transmission path, and one end of this transmission path is connected to the ODN interface 1 of the OLT, and the other end is connected through the optical splitter 1 to the ODN interface 1 of the ONU which has a backup ODN interface and to the ODN interface of other ONUs without any backup ODN interface. The E-R device 2 and the fibers on both sides of the E-R device 2 make up another independent transmission path, and one end of this transmission path is connected to the ODN interface 2 of the OLT, and the other end is connected through the optical splitter 2 to the ODN interface 2 of the ONU which has a backup ODN interface. Both the upstream signal and the downstream signal can be transmitted on the two transmission paths. The signal processing performed by the E-R device in the signal transmission process is the same as that in Type A-II, Type B-I, and Type C-I above, and is not described further.

Figure 9B:
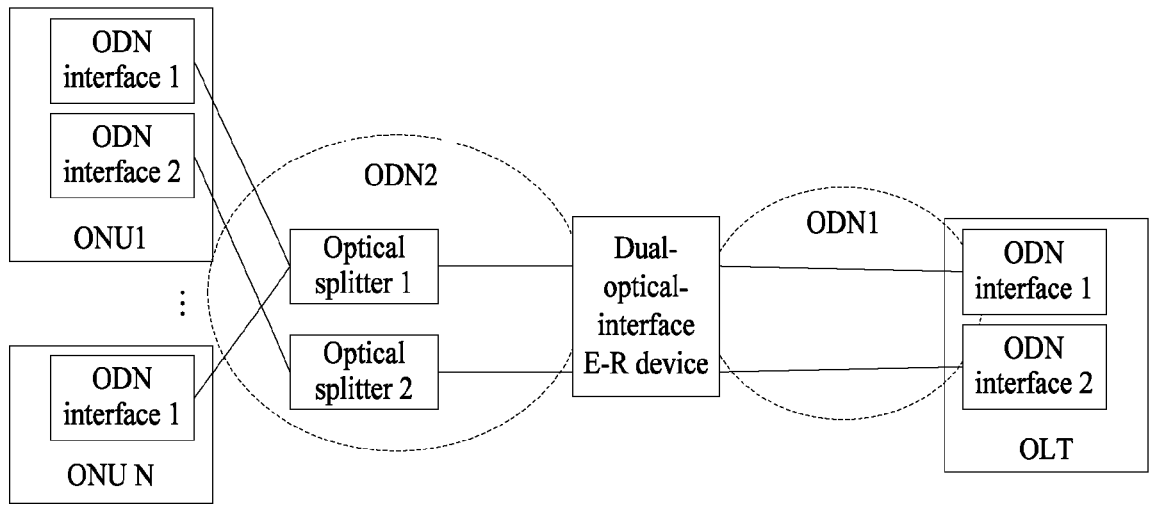
FIG. 9b shows an LR-PON system under type D-II protection according to an embodiment of the present invention.

Type D-II: The fibers in the ODN on both sides of the E-R device are backed up, and a dual-optical-interface E-R device is applied. As shown in FIG. 9b, the OLT is connected to two fiber transmission paths through two ODN interfaces. The two fiber transmission paths share an E-R device through different optical interfaces. Likewise, the two ODN interfaces of the ONU with a backup ODN interface are connected to two fiber transmission paths through two optical splitters; and the ONU without any backup ODN interface is connected to the two fiber transmission paths through one optical splitter. The two fiber transmission paths share an E-R device through different optical interfaces. The signal processing performed by the E-R device in the signal transmission process is the same as that in Type A-III, Type B-II, and Type C-II above, and is not described further.

All the protection types described above are compatible with the ODN interface of traditional ONUs and OLTs, and with the switching function of the traditional ONUs and OLTs. Table 2 is a summary of the characteristics of the four protection types.

TABLE 2

| Protection Type | Redundant Device | Backup State of ONU and OLT | E-R Standby State | Whether E-R Supports Switching | Whether Loss of Frame (LOF) or Loss of Signal (LOS) occurs in Switching | Protection Cost |
|---|---|---|---|---|---|---|
| Type A-I | Two fibers, a single E-R, a single OLT, a single ONU, and a single optical splitter | Cold backup | No backup | No, not supported | Yes | Lowest |
| Type A-II | Two fibers, two E-R devices, a single OLT, a single ONU, and a single optical splitter | Cold backup | Hot backup | No, not required | Yes | Low |
| Type A-III | Two fibers, dual-optical-interface E-R, a single OLT, a single ONU, and a single optical splitter | Cold backup | Cold backup | Automatic switching | Yes | Low |
| Type B-I | Two fibers, two E-R devices, two OLTs, a single ONU, and a single optical splitter | Cold backup | Hot backup | No, not required | Yes | Moderate |
| Type B-II | Two fibers, dual-optical-interface E-R, two OLTs, a single ONU, and a single optical splitter | Cold backup | Cold backup | Automatic switching | Yes | Moderate |
| Type C-I | Two fibers, two E-R devices, two OLTs, two ONUs, and two optical splitters | Hot backup | Hot backup | No, not required | No | Highest |
| Type C-II | Two fibers, dual-optical-interface E-R, two OLTs, two ONUs, and two optical splitters | Hot backup | Cold backup | Automatic switching | Yes | Highest |
| Type D-I | Two fibers, two E-R devices, two OLTs, partially two ONUs, and two groups of optical splitter pairs | Cold backup | Hot backup | No, not required | Yes | High |

TABLE 2-continued

| Protection Type | Redundant Device | Backup State of ONU and OLT | E-R Standby State | Whether E-R Supports Switching | Whether Loss of Frame (LOF) or Loss of Signal (LOS) occurs in Switching | Protection Cost |
|---|---|---|---|---|---|---|
| Type D-II | Two fibers, dual-optical-interface E-R, two OLTs, partially two ONUs, and two groups of optical splitter pairs | Cold backup | Cold backup | Automatic switching | Yes | High |

In Type A-I, Type A-II, Type B-I, Type C-I and Type D-I above, the E-R device may be capable of signal detection or not.

Figure 1:
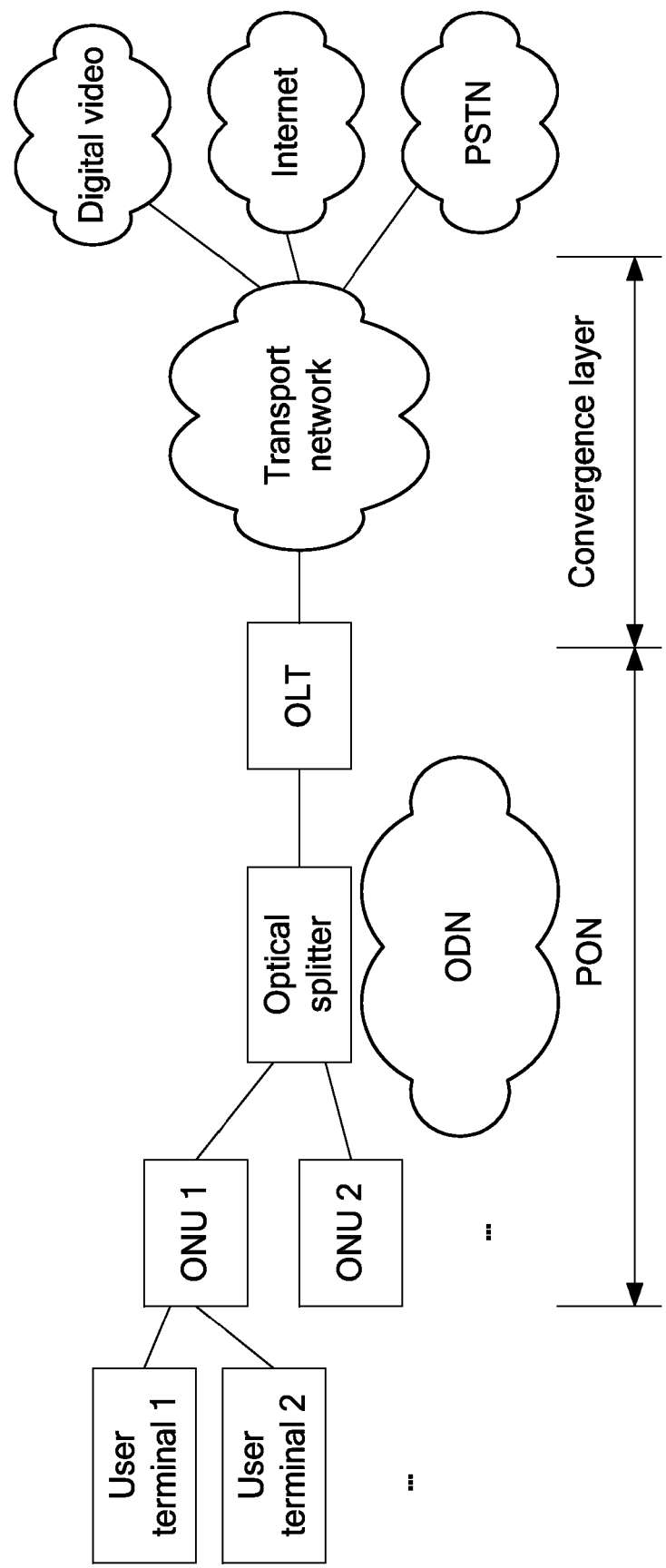
FIG. 1 shows a network architecture of a traditional PON.
Figure 2:
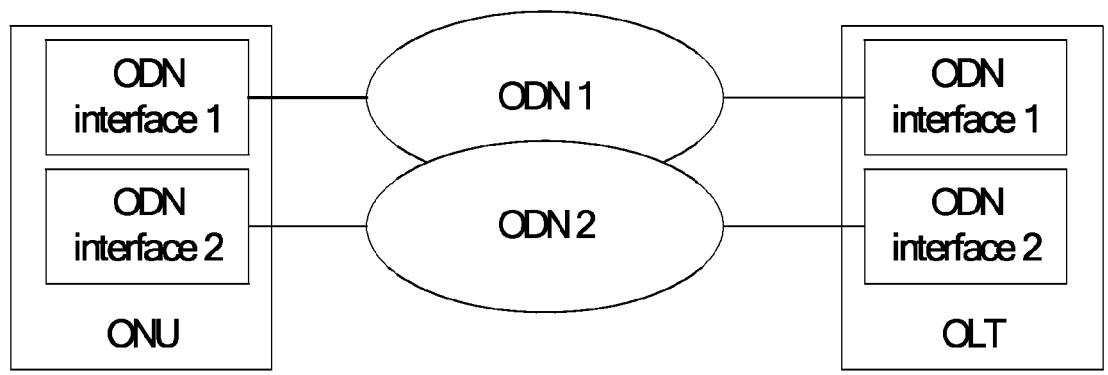
FIG. 2 shows a traditional GPON system backup model.
Figure 3A:
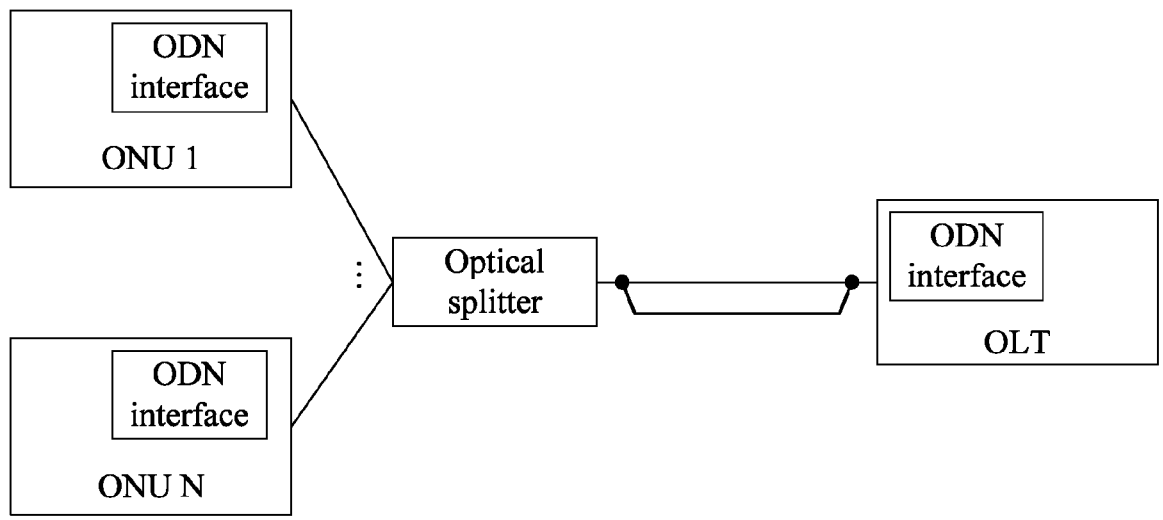
FIG. 3a shows a traditional first protection mode for a GPON.
Figure 3B:
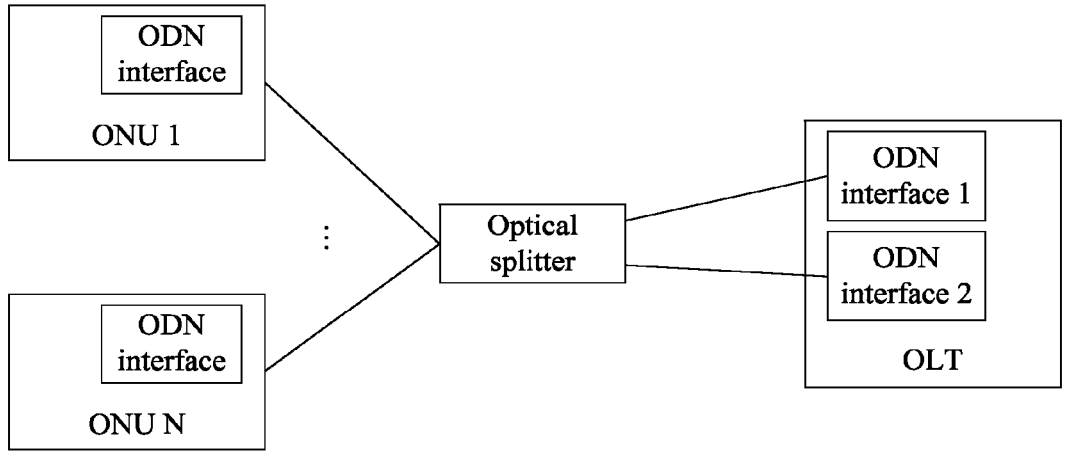
FIG. 3b shows a traditional second protection mode for a GPON.
Figure 3C:
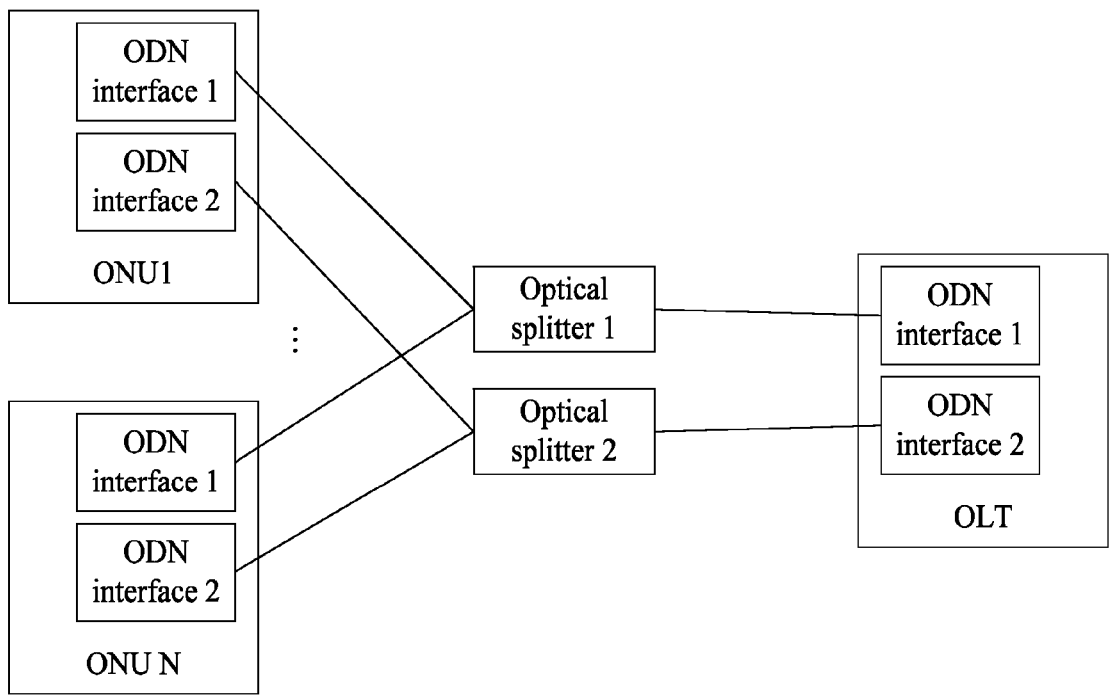
FIG. 3c shows a traditional third protection mode for a GPON.
Figure 3D:
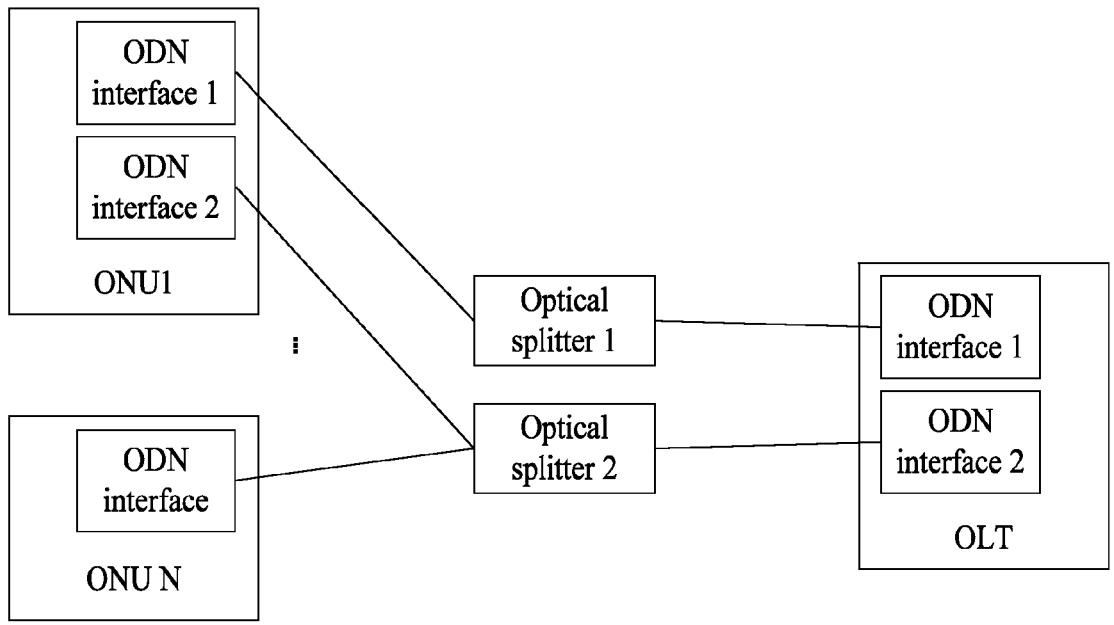
FIG. 3d shows a traditional fourth protection mode for a GPON.
Figure 4:
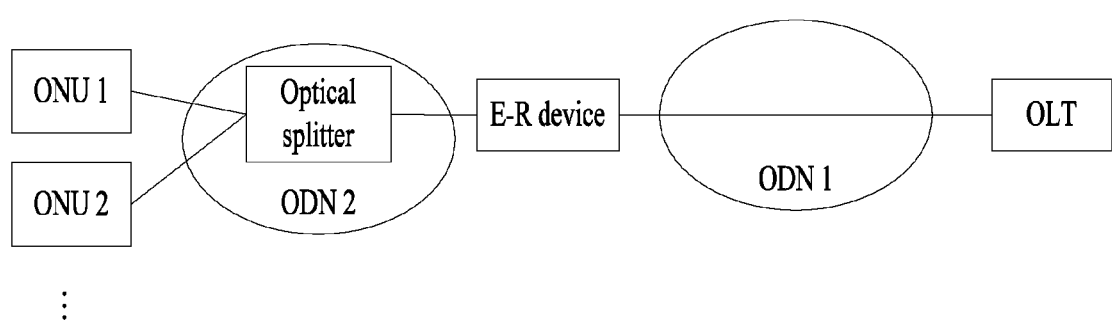
FIG. 4 shows a traditional structure of an LR-PON system implemented through an E-R device.
Figure 5:
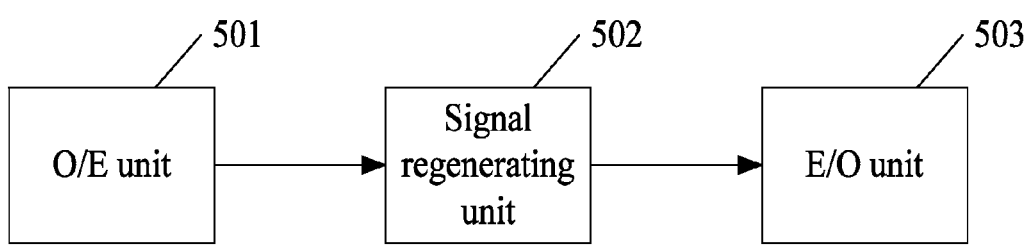
FIG. 5 shows a traditional structure of an E-R device.

If the E-R device is incapable of signal detection, the E-R device structure shown in FIG. 5 may be adopted. In this case, the E-R device performs O/E conversion for the received optical signal only, performs 3R processing for the converted electrical signal, converts the processed electrical signal into an optical signal, and sends the signal out.

If the E-R device is capable of signal detection, the E-R device obtains the downstream optical signal sent from the OLT or obtains the upstream optical signal sent from the ONU, and detects the received optical signal to check whether loss of signal (LOS) occurs; if LOS occurs, the E-R device returns a LOS alarm indication signal to the OLT or ONU which sends the optical signal. The E-R device may further obtains the electrical signal after O/E conversion, performs frame alignment for the data frame in the obtained electrical signal to judge whether loss of frame (LOF) occurs in the electrical signal. If LOF occurs, the E-R device returns a LOF alarm indication signal to the OLT or ONU which sends the optical signal. The E-R device may further perform data check for the aligned data frame, and judge whether SF or SD occurs in the electrical signal according to the data check result. If SF or SD occurs, the E-R device returns an alarm indication signal of SF or SD to the OLT or ONU which sends the optical signal.

In the foregoing process, the alarm indication signal is returned to the transmitter-side OLT or ONU for the transmitter-side OLT or ONU to know the failure on the transmission path between the OLT/ONU and the E-R device, and facilitate the OLT or ONU to locate the failure and/or assist in switching the transmission path. Besides, if SF or SD is detected, the E-R device may further insert an alarm indication signal into the signal sent to the receiver-side ONU or OLT. This alarm indication signal assists the receiver-side ONU or OLT in determining and selecting the non-defective signal and discarding the defective signal.

Figure 10:
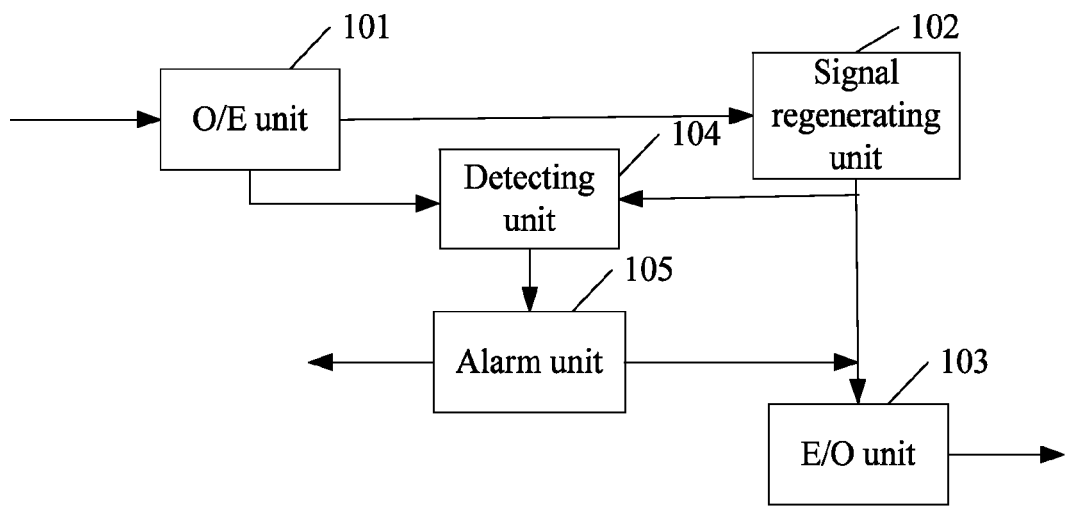
FIG. 10 shows a structure of a single-optical-interface E-R device according to an embodiment of the present invention.

In this case, the structure of the E-R device capable of signal detection is shown in FIG. 10. FIG. 10 shows a structure of an E-R device according to an embodiment of the present invention. The E-R device includes an O/E unit 101, a signal regenerating unit 102, an E/O unit 103, a detecting unit 104, and an alarm unit 105.

The O/E unit 101 is configured to: receive an optical signal from the ONU or OLT, and convert the received optical signal into an electrical signal.

The signal regenerating unit 102 is configured to perform 3R processing for the converted electrical signal from the O/E unit 101.

The E/O unit 103 is configured to: convert the electrical signal processed by the signal regenerating unit 102 into an optical signal, and send the optical signal to the receiver-side OLT or ONU.

The detecting unit 104 is configured to: obtain the optical signal sent by the ONU or OLT from the O/E unit 101, detect whether LOS occurs in the optical signal, and send an alarm notification to the alarm unit 105 if LOS occurs.

The alarm unit 105 is configured to return an alarm indication signal to the OLT or ONU which sends the optical signal after receiving the alarm notification from the detecting unit 104; or further configured to insert an alarm indication signal into the signal processed by the signal regenerating unit 102 after receiving the alarm notification from the detecting unit 104.

The detecting unit 104 is further configured to: detect whether LOF occurs in the signal processed by the signal regenerating unit 102, and send an alarm notification to the alarm unit 105 if LOF occurs; and further configured to: detect whether SF or SD occurs in the signal, and send an alarm notification to the alarm unit 105 if SF or SD occurs.

The Type A-III, Type B-II, Type C-II, and Type D-II E-R devices are detailed below. The Type A-III, Type B-II, Type C-II and Type D-II E-R devices are dual-optical-interface E-R devices. Each of such E-R devices includes two O/E units and two E/O units. The two O/E units are connected to two fiber transmission paths and receive signals from the OLT or ONU; and the two E/O units are connected to the two fiber transmission paths and send processed signals to the ONU or OLT.

The method for implementing LR-PON system protection through the dual-optical-interface E-R device includes the following: The E-R device obtains optical signals transmitted through two fiber transmission paths on one side, and performs O/E conversion for the optical signals transmitted through the two paths; selects an electrical signal on one path among the converted electrical signals on the two paths; and performs 3R processing for the selected electrical signal, performs E/O conversion for the processed electrical signal, and sends the converted optical signal through two fiber transmission paths on the other side. In the foregoing method, the LR-PON system is protected through a mechanism of "sending a signal on two paths and receiving a signal on only one path selectively" (hereinafter referred to as a "dual sending and selective receiving" mechanism).

The signals on the two paths are detected, and an electrical signal on one path is selected among the converted electrical signals on the two paths. The selected electrical signal may be the electrical signal of better quality, or the electrical signal selected randomly. The signal may be selected in two methods. The two selection methods are detailed below through two embodiments.

Figure 11A:
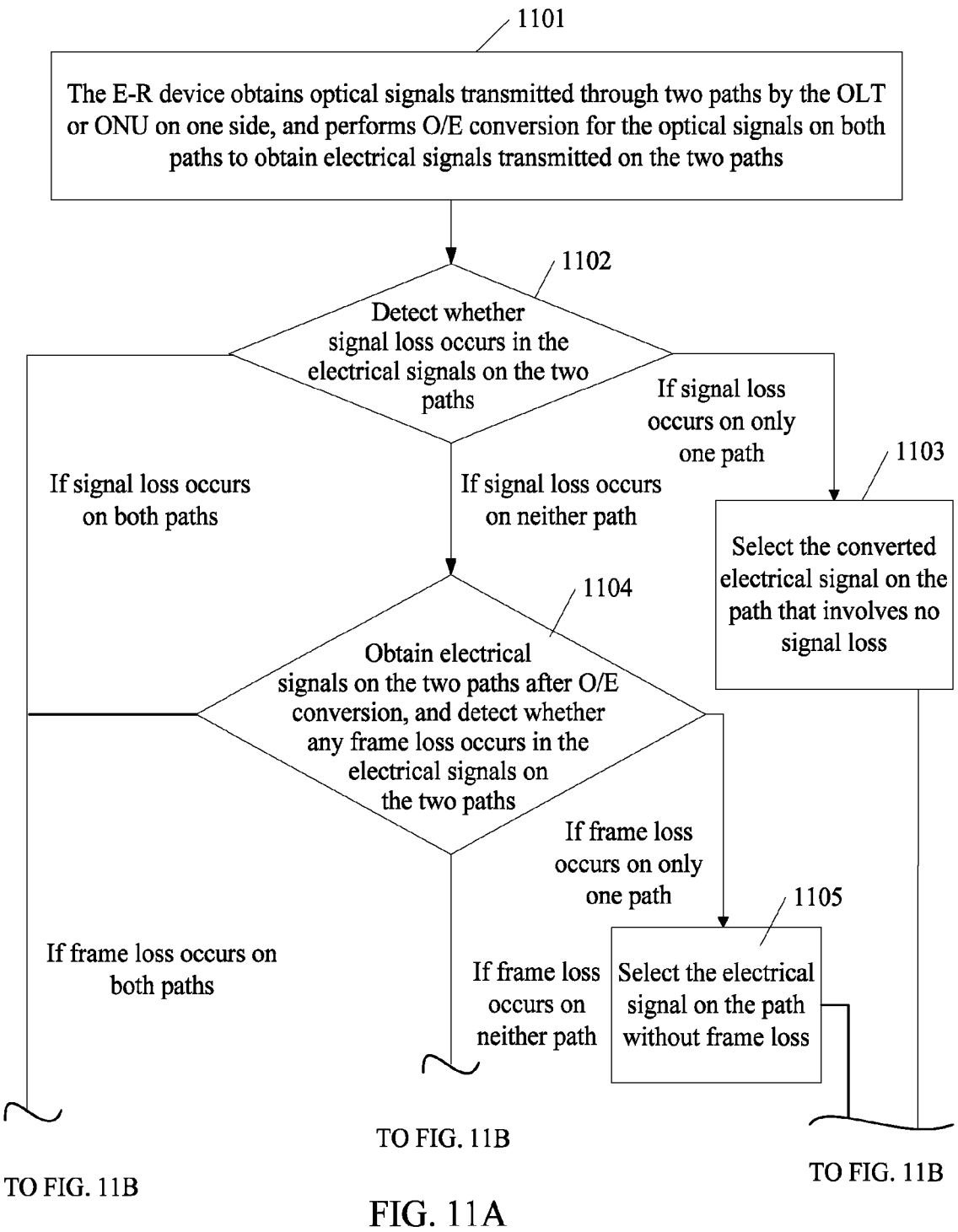
FIG. 11 is a flowchart of a first method for implementing LR-PON protection through a dual-optical-interface E-R device according to an embodiment of the present invention.
Figure 11B:
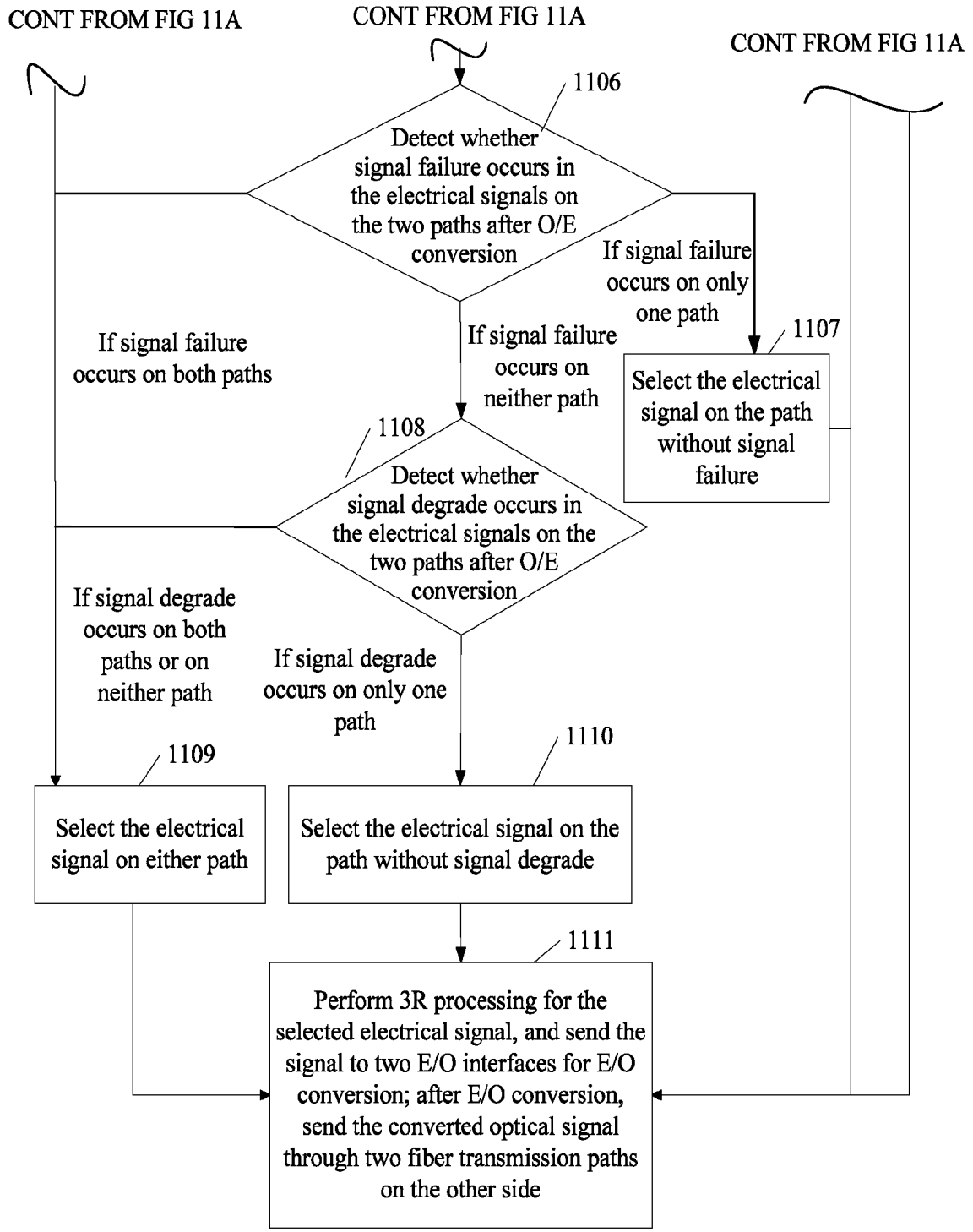

FIG. 11 is a flowchart of a first method for implementing LR-PON protection through a dual-optical-interface E-R device according to an embodiment of the present invention. As shown in FIG. 11, the method includes the following steps:

Step 1101: The E-R device obtains optical signals transmitted through two paths by the OLT or ONU on one side, and performs O/E conversion for the optical signals on both paths to obtain electrical signals transmitted on the two paths.

Step 1102: The E-R device detects whether LOS occurs in the converted electrical signal. If LOS occurs on one path, the process proceeds to step 1103; if LOS doesn't occur in either of the two paths, the process proceeds to step 1104; and, if both paths involve LOS, the process proceeds to step 1109.

In this step, the detection about whether any optical signal is lost on the two paths may include: detecting the optical power of the optical signal on either path to check whether the voltage or current of any electrical signal after O/E conversion is lower than a preset threshold of voltage or current; and, if yes, determining that this path involves LOS.

Besides, in this step, after detecting that a path involves LOS, the E-R device determines that this path has failed, and may return a LOS alarm indication signal to the OLT or ONU which sends the signal. If the signal is an upstream signal, the E-R device may return an alarm indication signal of upstream LOS to the ONU; and, if the signal is a downstream signal, the E-R device may return an alarm indication signal of downstream LOS to the OLT. The E-R device may insert an alarm indication signal into the 3R-processed signal, and send the signal to the ONU or OLT which receives the signal. If the signal is an upstream signal, the E-R device may insert an alarm indication signal of upstream LOS and send the signal to the OLT; and, if the signal is a downstream signal, the E-R device may insert an alarm indication signal of downstream LOS and send the signal to the ONU.

Step 1103: The E-R device selects the converted electrical signal on the path that does not involve LOS, and the process proceeds to step 1111.

Step 1104: The E-R device obtains electrical signals on the two paths after O/E conversion, and detects whether LOF occurs in the electrical signals on the two paths. If LOF occurs on one path, the process proceeds to step 1105; if neither path involves LOF, the process proceeds to step 1106; and, if both paths involve LOF, the process proceeds to step 1109.

In this step, the detection about whether LOF occurs in the electrical signals may be performed through frame alignment of the converted electrical signals.

Besides, in this step, after detecting that a path involves LOF, the E-R device may return a LOF alarm indication signal to the OLT or ONU which sends the signal. If the signal is an upstream signal, the E-R device may return an alarm indication signal of upstream LOF to the ONU; and, if the signal is a downstream signal, the E-R device may return an alarm indication signal of downstream LOF to the OLT. The E-R device may insert a LOF alarm indication signal into the 3R-processed signal, and send the signal to the ONU or OLT which receives the signal. If the signal is an upstream signal, the E-R device may insert an alarm indication signal of upstream LOF and send the signal to the OLT; and, if the signal is a downstream signal, the E-R device may insert an alarm indication signal of downstream LOF and send the signal to the ONU.

Step 1105: The E-R device selects the electrical signal on a path that does not involve LOF, and then the process proceeds to step 1111.

Step 1106: The E-R device detects whether SF exist in the electrical signals on the two paths after O/E conversion. If SF occurs in the electrical signal on one path, the process proceeds to step 1107; if SF occur in the electrical signal on both paths, the process proceeds to step 1109; and, if SF does not occur in either of the electrical signals on the two paths, the process proceeds to step 1108.

The detection of SF of the electrical signal after O/E conversion in this step may include: performing data check for the frame-aligned electrical signal, counting the bit error rate according to the data check result, judging whether the bit error rate is higher than a preset SF threshold, and determining that SF occurs in the electrical signal if the bit error rate is higher than the preset SF threshold.

Besides, in this step, after detecting that a path involves SF, the E-R device may return a SF alarm indication signal to the OLT or ONU which sends the signal. If the signal is an upstream signal, the E-R device may return an alarm indication signal of upstream SF to the ONU; and, if the signal is a downstream signal, the E-R device may return an alarm indication signal of downstream SF to the OLT. The E-R device may insert an alarm indication signal into the 3R-processed signal, and send the signal to the ONU or OLT which receives the signal. If the signal is an upstream signal, the E-R device may insert an alarm indication signal of upstream SF and send the signal to the OLT; and, if the signal is a downstream signal, the E-R device may insert an alarm indication signal of downstream SF and send the signal to the ONU.

Step 1107: The E-R device selects the electrical signal on a path that does not involve SF, and then the process proceeds to step 1111.

Step 1108: The E-R device detects whether SD occur in the electrical signals on the two paths after O/E conversion. If SD occurs in the electrical signal on one path, the process proceeds to step 1110; if SD occurs on both paths or on neither path, the process proceeds to step 1109.

The detection of SD of the electrical signal after O/E conversion in this step may include: performing data check for the frame-aligned electrical signal, counting the bit error rate according to the data check result, judging whether the bit error rate is higher than a preset SD threshold, and determining that SD occurs in the electrical signal if the bit error rate is higher than the preset SD threshold.

Besides, in this step, after detecting that a path involves SD, the E-R device may return a SD alarm indication signal to the OLT or ONU which sends the signal. If the signal is an upstream signal, the E-R device may return an alarm indication signal of upstream SD to the ONU; and, if the signal is a downstream signal, the E-R device may return an alarm indication signal of downstream SD to the OLT. The E-R device may insert an alarm indication signal into the 3R-processed signal, and send the signal to the ONU or OLT which receives the signal. If the signal is an upstream signal, the E-R device may insert an alarm indication signal of upstream SD and send the signal to the OLT; and, if the signal is a downstream signal, the E-R device may insert an alarm indication signal of downstream SD and send the signal to the ONU.

Step 1109: The E-R device selects the electrical signal on either path, and then the process proceeds to step 1111.

Step 1110: The E-R device selects the electrical signal on a path that does not involve SD.

Step 1111: The E-R device performs 3R processing for the selected electrical signal, and sends the signal to two E/O interfaces for E/O conversion. After E/O conversion, the E-R device sends the converted optical signal through two fiber transmission paths on the other side.

Table 3 shows the corresponding true value decision in the flow shown in FIG. 11. In this table, LOS represents loss of signal; LOF represents loss of frame; SF represents signal failure; SD represents signal degrade; A represents one fiber transmission path; B represents the other fiber transmission path; 1 means a defect is detected; 0 means that no defect is detected; and X is a random value.

TABLE 3

| LOS_A | LOS_B | LOF_A | LOF_B | SF_A | SF_B | SD_A | SD_B | Selection Result |
|---|---|---|---|---|---|---|---|---|
| 1 | 0 | X | X | X | X | X | X | B is selected |
| 0 | 1 | X | X | X | X | X | X | A is selected |
| 1 | 1 | X | X | X | X | X | X | Either path is selected |
| 0 | 0 | 1 | 0 | X | X | X | X | B is selected |
| 0 | 0 | 0 | 1 | X | X | X | X | A is selected |
| 0 | 0 | 1 | 1 | X | X | X | X | Either path is selected |
| 0 | 0 | 0 | 0 | 1 | 0 | X | X | B is selected |
| 0 | 0 | 0 | 0 | 0 | 1 | X | X | A is selected |
| 0 | 0 | 0 | 0 | 1 | 1 | X | X | Either path is selected |
| 0 | 0 | 0 | 0 | 0 | 0 | 1 | 0 | B is selected |
| 0 | 0 | 0 | 0 | 0 | 0 | 0 | 1 | A is selected |
| 0 | 0 | 0 | 0 | 0 | 0 | 1 | 1 | Either path is selected |
| 0 | 0 | 0 | 0 | 0 | 0 | 0 | 0 | Either path is selected |

Figure 12A:
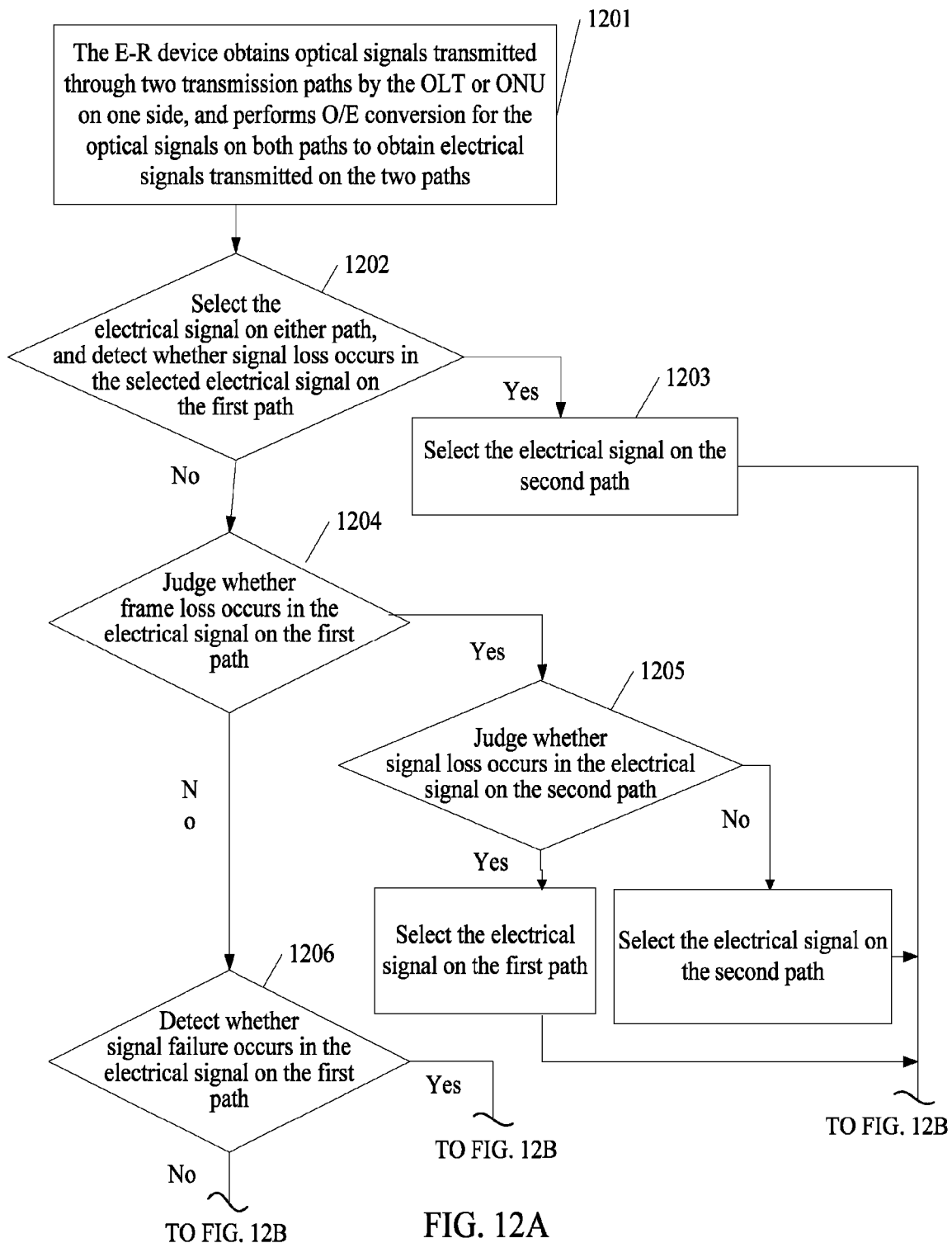
FIG. 12 is a flowchart of a second method for implementing LR-PON protection through a dual-optical-interface E-R device according to an embodiment of the present invention.
Figure 12B:
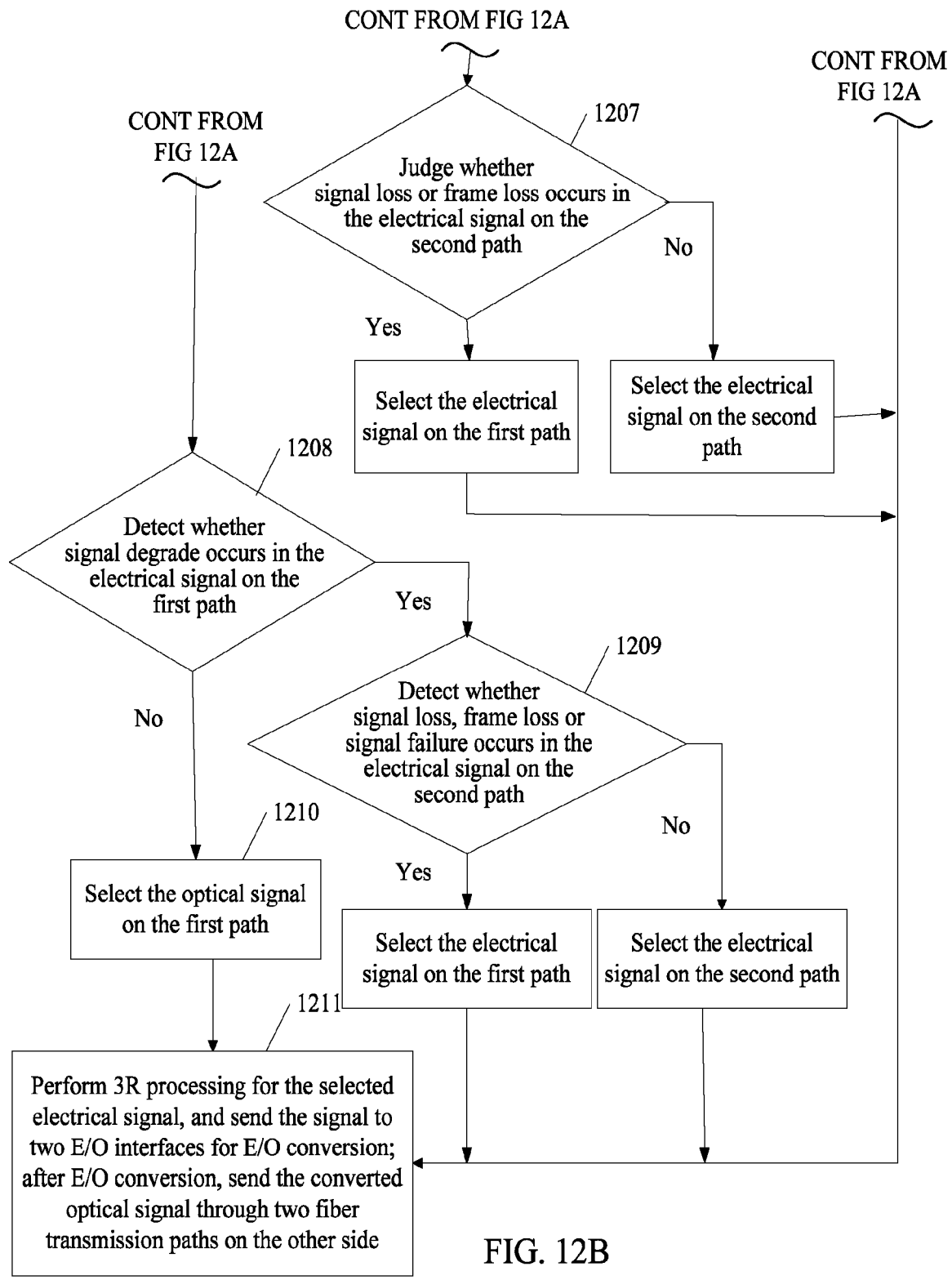

FIG. 12 is a flowchart of a second method for implementing LR-PON protection through a dual-optical-interface E-R device according to an embodiment of the present invention. As shown in FIG. 12, the method includes the following steps:

Step 1201: The E-R device obtains optical signals transmitted through two transmission paths by the OLT or ONU on one side, and performs O/E conversion for the optical signals on both paths to obtain electrical signals transmitted on the two paths.

Step 1202: The E-R device selects the electrical signal on either path (which is regarded as the first path). The E-R device detects whether LOS occurs in the electrical signal on the first path; if LOS occurs in the electrical signal on the first path, the process proceeds to step 1203; and, if LOS does not occur in the electrical signal on the first path, the process proceeds to step 1204.

In this step, the electrical signal on either path is selected, where the selected electrical signal may be on a path selected randomly or selected beforehand.

Step 1203: The E-R device selects the electrical signal on the other path (which is regarded as the second path), and then the process proceeds to step 1211.

Step 1204: The E-R device judges whether LOF occurs in the electrical signal on the first path; if LOF occurs in the electrical signal on the first path, the process proceeds to step 1205; and, if LOF does not occur in the electrical signal on the first path, the process proceeds to step 1206.

Step 1205: The E-R device judges whether LOS occurs in the electrical signal on the second path; if LOS occurs in the electrical signal on the second path, the E-R device still selects the electrical signal on the first path, and then the process proceeds to step 1211; and, if LOS does not occur in the electrical signal on the second path, the E-R device selects the electrical signal on the second path, and then the process proceeds to step 1211.

In this embodiment, the detection result about the electrical signal on either path may be stored. The E-R device may judge whether LOS occurs in the electrical signal on the second path in this step according to the stored detection result about the second path; or, perform LOS detection for the electrical signal on the second path, and then make judgment according to the detection result.

Step 1206: The E-R device detects whether SF occurs in the optical signal on the first path; if SF does not occur in the optical signal on the first path, the process proceeds to step 1207; and, if SF does not occur in the optical signal on the first path, the process proceeds to step 1208.

Step 1207: The E-R device judges whether LOS or LOF occurs in the electrical signal on the second path; if LOS or LOF occurs in the electrical signal on the second path, the E-R device selects the electrical signal on the first path, and then the process proceeds to step 1211; and, if LOS or LOF does not occur in the electrical signal on the second path, the E-R device selects the electrical signal on the second path, and then the process proceeds to step 1211.

The E-R device may judge whether LOS or LOF occurs in the electrical signal on the second path according to the stored detection result about the second path; or, detect LOS or LOF of the electrical signal on the second path, and then make judgment according to the detection result.

Step 1208: The E-R device detects whether SD occurs in the optical signal on the first path; if SD occurs in the optical signal on the first path, the process proceeds to step 1209; and, if SD does not occur in the optical signal on the first path, the process proceeds to step 1210.

Step 1209: The E-R device judges whether LOS, LOF or SF occurs in the electrical signal on the second path; if LOS, LOF or SF occurs in the electrical signal on the second path, the E-R device selects the electrical signal on the first path, and then the process proceeds to step 1211; and, if LOS, LOF or SF does not occur in the electrical signal on the second path, the E-R device selects the electrical signal on the second path, and then the process proceeds to step 1211.

The E-R device may judge whether LOS, LOF or SF occurs in the electrical signal on the second path according to the stored detection result about the second path; or, detect LOS, LOF or SF of the electrical signal on the second path, and then make judgment according to the detection result.

Step 1210: The E-R device selects the electrical signal on the first path.

Step 1211: The E-R device performs 3R processing for the selected electrical signal, and sends the signal to two E/O interfaces for E/O conversion. After E/O conversion, the E-R device sends the converted optical signal through two fiber transmission paths on the other side.

The mode of detecting LOS, LOF, SF or SD, and the mode of sending an alarm after detecting LOS, LOF, SF or SD in the flow shown in FIG. 12 are the same as those in FIG. 11, and are described further.

Table 4 shows the corresponding true value decision in the flow shown in FIG. 12. In this table, LOS represents loss of signal; LOF represents loss of frame; SF represents signal failure; SD represents signal degrade; A represents one fiber transmission path; B represents the other fiber transmission path; 1 means a defect is detected; 0 means that no defect is detected; X is a random value; and the suffix h represents the detection result about the signal on the other path, which may be the result of the previous detection stored in the storing unit.

detected; or LOS and LOF may be detected; or LOS, LOF, SF and SD may be detected. The order of severity of the defects is: LOS>LOF>SF>SD.

Figure 13:
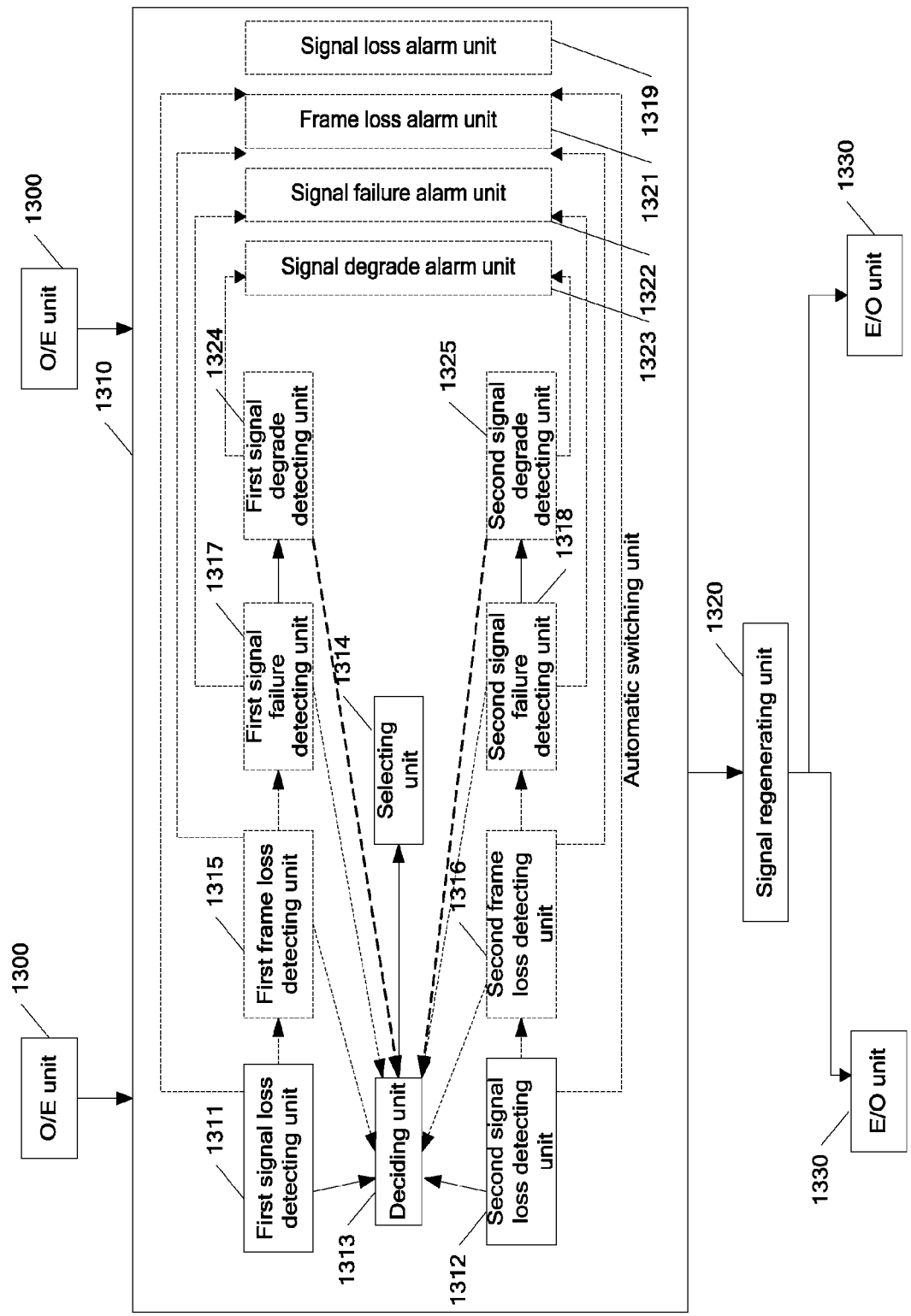
FIG. 13 shows a structure of a dual-optical-interface E-R device according to an embodiment of the present invention.

FIG. 13 shows a structure of a dual-optical-interface E-R device according to an embodiment of the present invention. As shown in FIG. 13, the E-R device may include: two O/E units 1300, an automatic switching unit 1310, a signal regenerating unit 1320, and two E/O units 1330.

Each O/E unit 1300 is configured to: receive an optical signal sent along a fiber transmission path connected to the O/E unit, and perform O/E conversion for the optical signal to obtain an electrical signal.

The automatic switching unit 1310 is configured to select the electrical signal on one path among the electrical signals transmitted on two paths and obtained from the two O/E units 1300.

TABLE 4

| LOS_B_h | LOF_B_h | SF_B_h | SD_B_h | Value Selected Currently | LOS | LOF | SF | SD | Selection Result |
|---|---|---|---|---|---|---|---|---|---|
| 1 | X | X | X | A | 0 | X | X | X | Current state (A) is maintained |
| 0 | X | X | X | A | 1 | X | X | X | B is selected |
| 1 | X | X | X | A | 1 | X | X | X | Current state (A) is maintained |
| 0 | 1 | X | X | A | 0 | 0 | X | X | Current state (A) is maintained |
| 0 | 0 | X | X | A | 0 | 1 | X | X | B is selected |
| 0 | 1 | X | X | A | 0 | 1 | X | X | Current state (A) is maintained |
| 0 | 0 | 1 | X | A | 0 | 0 | 0 | X | Current state (A) is maintained |
| 0 | 0 | 0 | X | A | 0 | 0 | 1 | X | B is selected |
| 0 | 0 | 1 | X | A | 0 | 0 | 1 | X | Current state (A) is maintained |
| 0 | 0 | 0 | 1 | A | 0 | 0 | 0 | 0 | Current state (A) is maintained |
| 0 | 0 | 0 | 0 | A | 0 | 0 | 0 | 1 | B is selected |
| 0 | 0 | 0 | 1 | A | 0 | 0 | 0 | 1 | Current state (A) is maintained |
| 0 | 0 | 0 | 0 | A | 0 | 0 | 0 | 0 | Current state (A) is maintained |

It is evident that FIG. 11 differs from FIG. 12 in that: In the flow shown in FIG. 11, the signals on the two paths are detected separately, and then the better one is selected according to the detection result and then sent out through two transmission paths; in the flow shown in FIG. 12, the signal on one path is detected, and, if the signal on this path is defective, switching is performed to detect the signal on the second path, and finally the better one is selected according to the detection result and then sent out through two transmission paths. In the flow shown in FIG. 11, the signals on the two paths are detected separately, and then the better one is selected according to the detection result, and therefore, the detection, judgment, and automatic switching are quick. In the flow shown in FIG. 12, the selection is performed before detection, and only one signal path needs to be detected, which is more cost-efficient.

Besides, a complete method flow is given in FIG. 11 and FIG. 12. In practice, only LOS of the electrical signal may be The signal regenerating unit 1320 is configured to: perform 3R processing for the electrical signal selected by the automatic switching unit 1310, and send the processed electrical signal to the two E/O units 1330.

Each E/O unit 1330 is configured to: convert the electrical signal sent by the signal regenerating unit 1320 into an optical signal, and send the optical signal through a fiber transmission path connected to the E/O unit.

The automatic switching unit 1310 may include: (1) a first LOS detecting unit 1311, configured to detect LOS of the converted electrical signal from one of the O/E units; (2) a second LOS detecting unit 1312, configured to detect LOS of the converted electrical signal from the other O/E unit; (3) a deciding unit 1313, configured to decide whether LOS occurs in the electrical signal on only one path according to the detection results of the first LOS detecting unit 1311 and the second LOS detecting unit 1312; and (4) a selecting unit 1314, configured to select the electrical signal on the path that does not involve LOS when the deciding unit 1313 decides that LOS occurs in the electrical signal on only one path.

If the detection involves only LOS and no other defects are detected, the selecting unit 1314 is further configured to select the electrical signal on either path when the deciding unit 1313 decides that LOS occurs on both paths or on neither path.

The automatic switching unit 1310 may further include: (1) a first LOF detecting unit 1315, configured to detect LOF of the electrical signal on one of the paths when the deciding unit 1313 decides that LOS occurs in the electrical signal on neither path; and (2) a second LOF detecting unit 1316, configured to detect LOF of the electrical signal on the other path when the deciding unit 1313 decides that LOS occurs in the electrical signal on neither path.

The first LOF detecting unit 1315 and the second LOF detecting unit 1316 may be frame aligning units.

The deciding unit 1313 may be further configured to decide whether LOF occurs in the electrical signal on only one path according to the detection results of the first LOF detecting unit 1315 and the second LOF detecting unit 1316.

The selecting unit 1314 is further configured to select the electrical signal on the path that does not involve LOF when the deciding unit 1313 decides that LOF occurs in the electrical signal on only one path.

If the detection involves only LOS and LOF without detecting other defects, the selecting unit 1314 is further configured to select the electrical signal on either path when the deciding unit 1313 decides that LOF occurs on both paths or on neither path.

The automatic switching unit 1310 may further include: (1) a first SF detecting unit 1317, configured to detect SF of the electrical signal on one of the paths when the deciding unit 1313 decides that LOF occurs in the electrical signal on neither path; and (2) a second SF detecting unit 1318, configured to detect SF of the electrical signal on the other path when the deciding unit 1313 decides that LOF occurs in the electrical signal on neither path.

The first SF detecting unit 1317 and the second SF detecting unit 1318 may be data checking units.

The deciding unit 1313 may be further configured to decide whether SF occurs in the electrical signal on only one path according to the detection results of the first SF detecting unit 1317 and the second SF detecting unit 1318.

The selecting unit 1314 may be further configured to select the electrical signal on the path that does not involve SF when the deciding unit 1313 decides that SF occurs in the electrical signal on only one path.

If the detection involves only LOS, LOF and SF without detecting other defects, the selecting unit 1314 is further configured to select the electrical signal on either path when the deciding unit 1313 decides that SF occurs on both paths or on neither path.

If the detection needs to involve SD, the automatic switching unit 1310 may further include: (1) a first SD detecting unit 1324, configured to detect SD of the electrical signal on one of the paths when the deciding unit 1313 decides that SF occurs in the electrical signal on neither path; and (2) a second SD detecting unit 1325, configured to detect SD of the electrical signal on the other path when the deciding unit 1313 decides that SF occurs in the electrical signal on neither path.

The deciding unit 1313 is further configured to decide whether SD occurs in the electrical signal on only one path according to the detection results of the first SD detecting unit 1324 and the second SD detecting unit 1325.

The selecting unit 1314 is further configured to: select the electrical signal on the path that does not involve SD when the deciding unit 1313 decides that SD occurs in the electrical signal on only one path; and select the electrical signal on either path when SD occurs in the electrical signals on both paths or on neither path.

The automatic switching unit 1310 may further include: a LOS alarm unit 1319, configured to return a LOS alarm indication signal to the transmitter-side OLT or ONU along a transmission path reverse to the path that involves LOS when LOS is detected by the first LOS detecting unit 1311 or the second LOS detecting unit 1312; and/or insert a LOS alarm indication signal into the same-direction downstream signal on the path that involves LOS.

The automatic switching unit 1310 may further include: a LOF alarm unit 1321, configured to return a LOF alarm indication signal to the transmitter-side OLT or ONU along a transmission path reverse to the path that involves LOF when LOF is detected by the first LOF detecting unit 1315 or the second LOF detecting unit 1316; and/or insert a LOF alarm indication signal into the same-direction downstream signal on the path that involves LOF.

The automatic switching unit 1310 may further include: a SF alarm unit 1322, configured to return a SF alarm indication signal to the transmitter-side OLT or ONU along a transmission path reverse to the path that involves SF when SF is detected by the first SF detecting unit 1317 or the second SF detecting unit 1318; and/or insert a SF alarm indication signal into the same-direction downstream signal on the path that involves SF.

The automatic switching unit 1310 may further include: a SD alarm unit 1323, configured to return a SD alarm indication signal to the transmitter-side OLT or ONU along a transmission path reverse to the path that involves SD when SD is detected by the first SD detecting unit 1324 or the second SD detecting unit 1325; and/or insert a SD alarm indication signal into the same-direction downstream signal on the path that involves SD.

The LOS alarm unit 1319, the LOF alarm unit 1321, the SF alarm unit 1322, and the SD alarm unit 1323 may be set independently of the automatic switching unit 1310.

Figure 14:
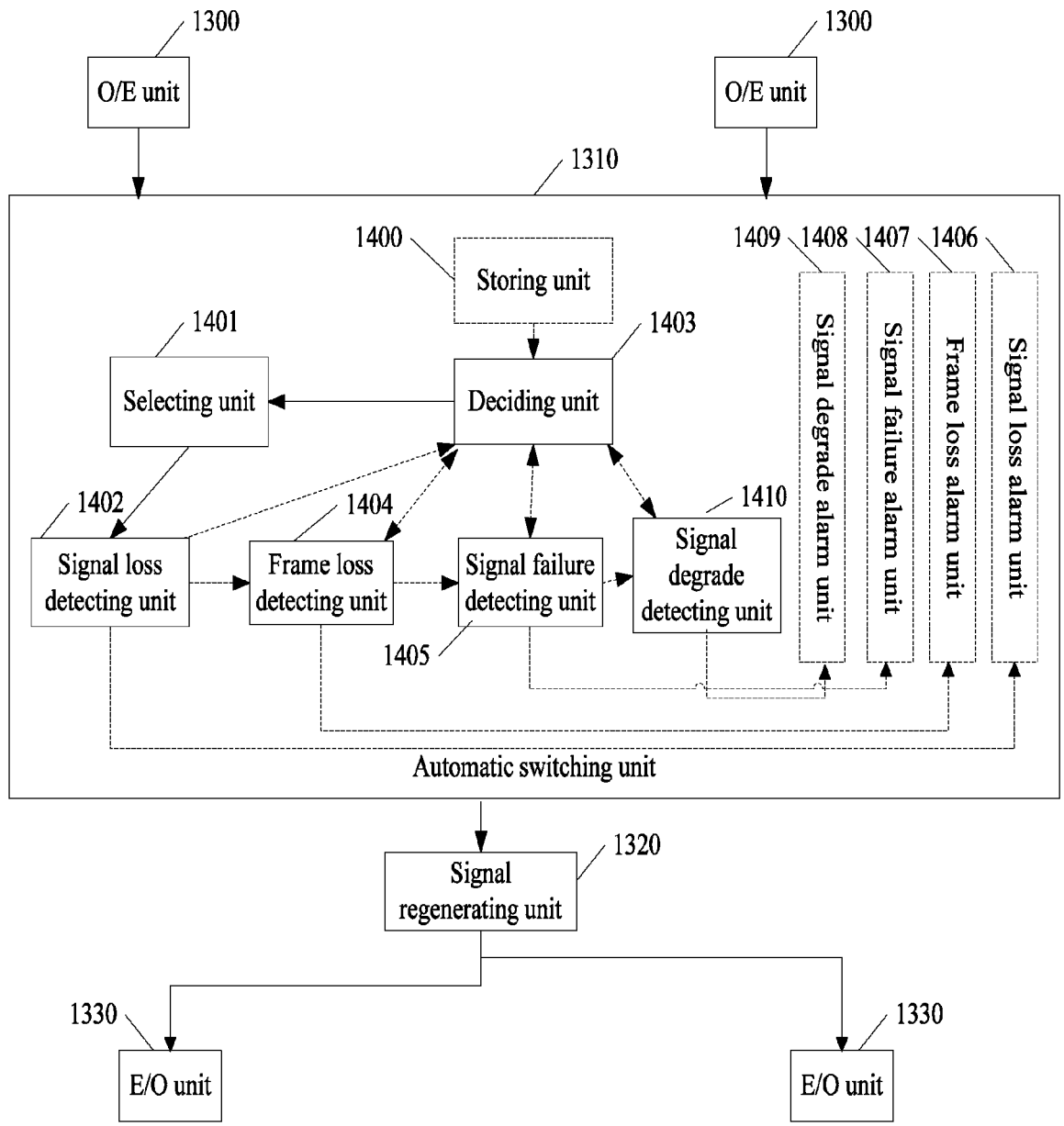
FIG. 14 shows another structure of a dual-optical-interface E-R device according to an embodiment of the present invention.

FIG. 14 shows another structure of the automatic switching unit 1310. This automatic switching unit 1310 may include: (1) a selecting unit 1401, configured to select the electrical signal on either path (which is regarded as the first path) after conversion is performed by two O/E units; (2) a LOS detecting unit 1402, configured to detect LOS of the electrical signal on the first path selected by the selecting unit 1401; and (3) a deciding unit 1403, configured to decide whether LOS occurs in the electrical the signal on the first path according to the detection result of the LOS detecting unit 1402.

The selecting unit 1401 is further configured to select the electrical signal on the other path (which is regarded as the second path) when the deciding unit 1403 decides that LOS occurs in the electrical signal on the first path.

The E-R device may further include a storing unit 1400, which is configured to store the detection result about the electrical signal on either path.

The automatic switching unit 1310 may further include a LOF detecting unit 1404, which is configured to detect LOF of the electrical signal on the first path when the deciding unit 1403 decides that no LOS occurs in the electrical signal on the first path.

The LOF detecting unit 1404 may be a frame aligning unit.

The deciding unit 1403 is further configured to: judge whether LOF occurs in the electrical signal on a path according to the detection result of the LOF detecting unit 1404, and judge whether LOS occurs in the electrical signal on the second path according to the detection result about the electrical signal on the second path stored in the storing unit 1400 or according to the detection result obtained after the electrical signal on the second path is sent to the LOS detecting unit 1402 for detection.

The selecting unit 1401 is configured to: select the electrical signal on the first path when the deciding unit 1403 decides that LOF occurs in the electrical signal on the first path and LOS occurs in the electrical signal on the second path; and select the electrical signal on the second path when the deciding unit 1403 decides that LOF occurs in the electrical signal on the first path but no LOS occurs in the electrical signal on the second path.

The automatic switching unit 1310 may further include a frame failure detecting unit 1405, which is configured to detect SF of the electrical signal on the first path when the deciding unit 1403 decides that no LOF occurs in the electrical signal on the first path.

The SF detecting unit 1405 may be a data checking unit.

The deciding unit 1403 is further configured to: judge whether SF occurs in the electrical signal on the first path according to the detection result of the SF detecting unit 1405, and, if yes, judge whether LOS or LOF occurs in the electrical signal on the second path according to the detection result about the electrical signal on the second path stored in the storing unit 1400 or according to the detection result obtained after the electrical signal on the second path is sent to the LOS detecting unit 1402 and/or the LOF detecting unit 1404 for detection.

The selecting unit 1401 is configured to: select the electrical signal on the first path when the deciding unit 1403 decides that SF occurs in the electrical signal on the first path and LOS or LOF occurs in the electrical signal on the second path; and select the electrical signal on the second path when the deciding unit 1403 decides that SF occurs in the electrical signal on the first path but no LOS or LOF occurs in the electrical signal on the second path.

The automatic switching unit 1310 may further include a SD detecting unit 1410, which is configured to detect SD of the electrical signal on the first path when the deciding unit 1403 decides that no SF occurs in the electrical signal on the first path.

The deciding unit 1403 is further configured to: judge whether SD occurs in the electrical signal on the first path according to the detection result of the SD detecting unit 1410, and, if yes, judge whether LOS, LOF or SF occurs in the electrical signal on the second path according to the detection result about the electrical signal on the second path stored in the storing unit 1400 or according to the detection result obtained after the electrical signal on the second path is sent to the LOS detecting unit 1402 and/or the LOF detecting unit 1404 and/or SF detecting unit 1405 for detection.

The selecting unit 1401 is further configured to: select the electrical signal on the first path when the deciding unit 1403 decides that SD occurs in the electrical signal on the first path and LOS, LOF or SF occurs in the electrical signal on the second path; and select the electrical signal on the second path when the deciding unit 1403 decides that SD occurs in the electrical signal on the first path but no LOS, LOF or SF occurs in the electrical signal on the second path.

The automatic switching unit 1310 may further include: a LOS alarm unit 1406, configured to: return a LOS alarm indication signal to the transmitter-side OLT or ONU along a transmission path reverse to the path that involves LOS when LOS is detected by the LOS detecting unit 1402; and/or insert a LOS alarm indication signal into the same-direction downstream signal on the path that involves LOS.

The automatic switching unit 1310 may further include: a LOF alarm unit 1407, configured to: return a LOF alarm indication signal to the transmitter-side OLT or ONU along a transmission path reverse to the path that involves LOF when LOF is detected by the LOF detecting unit 1404; and/or insert a LOF alarm indication signal into the same-direction downstream signal on the path that involves LOF.

The automatic switching unit 1310 may further include: a SF alarm unit 1408, configured to: return a SF alarm indication signal to the transmitter-side OLT or ONU along a transmission path reverse to the path that involves SF when SF is detected by the SF detecting unit 1405; and/or insert a SF alarm indication signal into the same-direction downstream signal on the path that involves SF.

The E-R device 1310 further includes: a SD alarm unit 1409, configured to return a SD alarm indication signal to the transmitter-side OLT or ONU along a transmission path reverse to the path that involves SD when SD is detected by the SD detecting unit 1410; and/or insert a SD alarm indication signal into the same-direction downstream signal on the path that involves SD.

The LOS alarm unit 1406, the LOF alarm unit 1407, the SF alarm unit 1408, and the SD alarm unit 1409 may be set independently of the automatic switching unit 1310.

The system shown in FIG. 13 corresponds to the flow shown in FIG. 11, and the system shown in FIG. 14 corresponds to the flow shown in FIG. 12. The systems in FIG. 13 and FIG. 14 show that two detecting units are set in FIG. 13 to detect signals on two paths respectively, and therefore, the detection, judging and automatic switching are quick. Only one detecting unit is set in FIG. 14, and thus the equipment cost is low.

The foregoing technical solution shows that: In the method, system and device for protecting the LR-PON system, the E-R device receives an optical signal from the OLT or ONU through two fiber transmission paths on one side, performs O/E conversion, signal regeneration and E/O conversion for the optical signal, and sends the signal to the ONU or OLT through two fiber transmission paths on the other side. Through backup of the fiber transmission path, an LR-PON system protection method is provided to improve the reliability of the LR-PON system. The method, system, and device for protecting the LR-PON system under the present invention all support and are compatible with the existing functions of all devices in the existing LR-PON system. Moreover, multiple protection types are provided herein to meet different requirements and application scenarios.

A dual-optical-interface E-R device is provided herein to reduce probability of failures that occur in the LR-PON system after multiple fiber sections fail or a new E-R device is added. Two solutions are provided herein, and the user may select one of the solutions according to different switching performance requirements and equipment costs. The E-R device under the present invention is compatible with the existing PON system, and supports the automatic switching and failure location functions of the existing OLT or ONU.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A Long Reach Passive Optical Network (LR-PON) protection method, comprising:
   obtaining, by an Electrical Relay (E-R) device, optical signals transmitted through two fiber transmission paths on one side of the E-R device, and performing optical-to-electrical (O/E) conversion for the optical signals transmitted through the two paths;
   detecting whether loss of signal (LOS) occurs in the converted electrical signals;
   if the LOS occurs in the electrical signal on one path, selecting the electrical signal on the path that does not involve the LOS;
   if detecting that the LOS occurs in the electrical signal on neither path, detecting whether loss of frame (LOF) occurs in the electrical signals on the two paths, and selecting the electrical signal on the path that does not involve the LOF if the LOF occurs in the electrical signal on one path; and
   performing, by the E-R device, signal regeneration for the selected electrical signal,
   performing, by the E-R device, electrical-to-optical (E/O) conversion for the regenerated electrical signal, and
   sending, by the E-R device, the converted optical signal through two fiber transmission paths on the other side of the E-R device.

2. The method of claim 1, further comprising:
   if detecting that the LOS occurs in the electrical signals on both paths, selecting the electrical signal on either path.

3. The method of claim 1, further comprising one of the following:
   (1) selecting the electrical signal on either path if detecting that the LOF occurs in the electrical signals on both paths or on neither path; and
   (2) detecting whether signal failure (SF) occurs in the electrical signals on the two paths if detecting that the LOF occurs in the electrical signal on neither path, and selecting the electrical signal on the path that does not involve the SF if the SF occurs in the electrical signal on one path.

4. The method of claim 3, further comprising one of the following:
   (1) selecting the electrical signal on either path if detecting that SF occurs in the electrical signals on both paths or on neither path; and
   (2) detecting whether signal degrade (SD) occurs in the electrical signals on the two paths if detecting that the SF occurs in the electrical signal on neither path; selecting the electrical signal on the other path if the SD occurs in the electrical signal on one path; and selecting the electrical signal on either path if the SD occurs in the electrical signals on both paths or on neither path.

5. An Electrical Relay (E-R) device, comprising: two optical-to-electrical conversion units (O/E units), an automatic switching unit, a signal regenerating unit, and two electrical-to-optical conversion units (E/O units), wherein:
   each O/E unit is configured to receive an optical signal sent along a fiber transmission path connected to the O/E unit, and perform O/E conversion for the optical signal to obtain an electrical signal;
   the automatic switching unit is configured to select the electrical signal on one path among electrical signals transmitted on the two paths and obtained from the two O/E units, wherein the automatic switching unit comprises:
      a first loss of signal (LOS) detecting unit, configured to detect the LOS of the converted electrical signal from one of the O/E units;
      a second LOS detecting unit, configured to detect the LOS of the converted electrical signal from the other O/E unit;
      a first deciding unit, configured to decide whether the LOS occurs in the electrical signal on only one path according to detection results of the first LOS detecting unit and the second LOS detecting unit;
      a first selecting unit, configured to select the electrical signal on the path that does not involve the LOS when the deciding unit decides that the LOS occurs in the electrical signal on only one path;
      a first loss of frame (LOF) detecting unit, configured to detect the LOF of the electrical signal on one of the paths when the first deciding unit decides that the LOS occurs in the electrical signal on neither path;
      a second LOF detecting unit, configured to detect the LOF of the electrical signal on the other path when the first deciding unit decides that the LOS occurs in the electrical signal on neither path;
      the first deciding unit, further configured to decide whether the LOF occurs in the electrical signal on only one path according to detection results of the first LOF detecting unit and the second LOF detecting unit; and
      the first selecting unit, further configured to select the electrical signal on the path that does not involve the LOF when the first deciding unit decides that the LOF occurs in the electrical signal on only one path;
   the signal regenerating unit is configured to perform signal regeneration for the electrical signal selected by the automatic switching unit, and send the regenerated electrical signal to the two E/O units; and
   each E/O unit is configured to convert the electrical signal sent by the signal regenerating unit into the optical signal, and send the optical signal through a fiber transmission path connected to the E/O unit.

6. The E-R device of claim 5, wherein the automatic switching unit further comprises:
   a first signal failure (SF) detecting unit, configured to detect the SF of the electrical signal on one of the paths when the first deciding unit decides that the LOF occurs in the electrical signal on neither path;
   a second SF detecting unit, configured to detect the SF of the electrical signal on the other path when the first deciding unit decides that the LOF occurs in the electrical signal on neither path;
   the deciding unit, further configured to decide whether the SF occurs in the electrical signal on only one path according to detection results of the first SF detecting unit and the second SF detecting unit; and
   the selecting unit, further configured to select the electrical signal on the path that does not involve the SF when the first deciding unit decides that the SF occurs in the electrical signal on only one path.

7. The E-R device of claim 6, wherein the automatic switching unit further comprises:
   a first signal degrade (SD) detecting unit, configured to detect the SD of the electrical signal on one of the paths when the first deciding unit decides that the SF occurs in the electrical signals on neither paths;
   a second SD detecting unit, configured to detect the SD of the electrical signal on the other path when the first deciding unit decides that the SF occurs in the electrical signals on neither paths;

the first deciding unit, further configured to decide whether the SD occurs in the electrical signal on only one path according to detection results of the first SD detecting unit and the second SD detecting unit; and the first selecting unit, further configured to select the electrical signal on the path that does not involve the SD when the first deciding unit decides that the SD occurs in the electrical signal on only one path; and select the electrical signal on either path when the SD occurs in the electrical signals on both paths or on neither path.

8. A Long Reach Passive Optical Network (LR-PON) protection system, comprising an Optical Line Terminal (OLT), an Electrical Relay (E-R) device, and an Optical Network Unit (ONU), wherein:

the OLT is configured to: send an optical signal to the E-R device through two fiber transmission paths, and receive the optical signal from the E-R device through the two fiber transmission paths;

the E-R device is configured to receive the optical signal from the OLT or ONU on one side, perform optical-to-electrical (O/E) conversion, signal regeneration, and electrical-to-optical (E/O) conversion for the optical signal, and send the signal to the ONU or OLT on the other side, wherein the E-R device is configured to:

obtain the optical signals transmitted through the two fiber transmission paths from one side, perform O/E conversion for the optical signals on the two paths to obtain electrical signals transmitted on the two paths, select an electrical signal on one of the paths among the converted electrical signals on the two paths, performs signal regeneration for the selected electrical signal, perform E/O conversion for the regenerated electrical signal to obtain an optical signal, and send the optical signal through the two fiber transmission paths on the other side, wherein selecting the electrical signal on one of the paths among the converted electrical signals on the two paths comprising:

detecting whether loss of signal (LOS) occurs in the converted electrical signals;

if the LOS occurs in the electrical signal on one path, selecting the electrical signal on the path that does not involve the LOS;

if detecting that the LOS occurs in the electrical signal on neither path, detecting whether loss of frame (LOF) occurs in the electrical signals on the two paths, and selecting the electrical signal on the path that does not involve the LOF if the LOF occurs in the electrical signal on one path; and the ONU is configured to: receive the optical signal from the E-R device through two fiber transmission paths, and send the optical signal to the E-R device through the two fiber transmission paths.

9. The system of claim 8, wherein:

the E-R device is further configured to detect a defect of the electrical signal after the O/E conversion.

10. The system of claim 8, wherein:

the E-R device is further configured to return an alarm indication signal along a transmission path of the optical signal corresponding to the electrical signal to the OLT or ONU which sends the optical signal after detecting that the electrical signal is defective; and/or insert an alarm indication signal into the electrical signal, and convert the electrical signal with the inserted alarm indication signal into an optical signal, and send the optical signal to the ONU or OLT which receives the optical signal.

11. The system of claim 8, wherein:

the OLT is an OLT with a single Optical Distribution Network (ODN) interface, or an OLT with two ODN interfaces; and the ONU is an ONU with a single ODN interface or an ONU with two ODN interfaces.

12. An Electrical Relay (E-R) device, comprising: two optical-to-electrical conversion units (O/E) units, an automatic switching unit, a signal regenerating unit, a storing unit, and two electrical-to-optical conversion units (E/O) units, wherein:

each O/E unit is configured to: receive an optical signal sent along a fiber transmission path connected to the O/E unit, and perform O/E conversion for the optical signal to obtain an electrical signal;

the automatic switching units configured to select the electrical signal on one path among electrical signals transmitted on the two paths and obtained from the two O/E units, wherein the automatic switching unit comprises:

a second selecting unit is configured to select the electrical signal on either path, namely, a first path, after conversion is performed by the two O/E units;

a third loss of signal (LOS) detecting unit is configured to detect the LOS of the electrical signal selected by the second selecting unit;

a second deciding unit is configured to decide whether the LOS occurs in the electrical signal on the first path according to a detection result of the third LOS detecting unit;

the second selecting unit is further configured to select the electrical signal on a second path when the second deciding unit decides that the LOS occurs in the electrical signal on the first path;

a third loss of frame (LOF) detecting unit, which is configured to detect the LOF of the electrical signal on the first path when the second deciding unit decides that no LOS occurs in the electrical signal on the first path;

the second deciding unit is further configured to: judge whether the LOF occurs in the electrical signal on the first path according to the detection result of the third LOF detecting unit, and judge whether the LOS occurs in the electrical signal on the second path according to the detection result about the electrical signal on the second path stored in the storing unit or according to a detection result obtained after the electrical signal on the second path is sent to the third LOS detecting unit for detection; and the second selecting unit is configured to: select the electrical signal on the first path when the second deciding unit decides that the LOF occurs in the electrical signal on the first path and the LOS occurs in the electrical signal on the second path; and select the electrical signal on the second path when the second deciding unit decides that the LOF occurs in the electrical signal on the first path but no LOS occurs in the electrical signal on the second path;

the storing unit is configured to store the detection result about the electrical signal on either path;

the signal regenerating unit is configured to: perform signal regeneration for the electrical signal selected by the automatic switching unit, and send the regenerated electrical signal to the two E/O units; and each E/O unit is configured to: convert the electrical signal sent by the signal regenerating unit into the optical signal, and send the optical signal through a fiber transmission path connected to the E/O unit.

13. The E-R device of claim 12, wherein:

the automatic switching unit further comprises a third signal failure (SF) detecting unit, which is configured to detect SF of the electrical signal on the first path when the second deciding unit decides that no LOF occurs in the electrical signal on the first path;

the second deciding unit is further configured to judge whether the SF occurs in the electrical signal on the first path according to a detection result of the third SF detecting unit, and, if the SF occurs in the electrical signal on the first path according to a detection result of the third SF detecting unit, judge whether the LOS or the LOF occurs in the electrical signal on the second path according to the detection result about the electrical signal on the second path stored in the storing unit or according to a detection result obtained after the electrical signal on the second path is sent to at least one of the third LOS detecting unit and the third LOF detecting unit for detection; and the second selecting unit is further configured to select the electrical signal on the first path when the second deciding unit decides that the SF occurs in the electrical signal on the first path and the LOS or the LOF occurs in the electrical signal on the second path; and select the electrical signal on the second path when the second deciding unit decides that SF occurs in the electrical signal on the first path but no LOS or LOF occurs in the electrical signal on the second path.

14. The E-R device of claim 13, wherein:

the automatic switching unit further comprises a third signal degrade (SD) detecting unit, which is configured to detect SD of the electrical signal on the first path when the second deciding unit decides that no SF occurs in the electrical signal on the first path;

the second deciding unit is further configured to judge whether the SD occurs in the electrical signal on the first path according to a detection result of the third SD detecting unit, and, if the SD occurs in the electrical signal on the first path according to a detection result of the third SD detecting unit, judge whether the LOS, the LOF or the SF occurs in the electrical signal on the second path according to the detection result about the electrical signal on the second path stored in the storing unit or according to a detection result obtained after the electrical signal on the second path is sent to at least one of the third LOS detecting unit and the third LOF detecting unit and/or the third SF detecting unit for detection; and the second selecting unit is further configured to select the electrical signal on the first path when the second deciding unit decides that the SD occurs in the electrical signal on the first path and the LOS, the LOF or the SF occurs in the electrical signal on the second path; and select the electrical signal on the second path when the second deciding unit decides that the SD occurs in the electrical signal on the first path but no LOS, LOF or SF occurs in the electrical signal on the second path.

* * * * *